United States Patent
Corbetta et al.

(10) Patent No.: US 11,614,892 B2
(45) Date of Patent: Mar. 28, 2023

(54) MEMORY SYSTEM ARCHITECTURE FOR HETEROGENEOUS MEMORY TECHNOLOGIES

(71) Applicant: Micron Technology, Inc., Boise, ID (US)

(72) Inventors: Simone Corbetta, Lecco (IT); Antonino Capri', Bergamo (IT); Alessandro Lucio Iannuzzi, Sesto San Giovanni (IT); Filippo Leonini, Romagnano Sesia (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/125,888

(22) Filed: Dec. 17, 2020

(65) Prior Publication Data

US 2022/0197552 A1    Jun. 23, 2022

(51) Int. Cl.
*G06F 3/06* (2006.01)

(52) U.S. Cl.
CPC .......... *G06F 3/0659* (2013.01); *G06F 3/0604* (2013.01); *G06F 3/0635* (2013.01); *G06F 3/0683* (2013.01)

(58) Field of Classification Search
CPC .... G06F 3/0659; G06F 3/0604; G06F 3/0635; G06F 3/0683; G06F 3/0685; G06F 3/0638
See application file for complete search history.

(56) References Cited

U.S. PATENT DOCUMENTS

| | | | |
|---|---|---|---|
| 7,584,335 B2* | 9/2009 | Daniels | G06F 12/0875 365/230.01 |
| 8,370,558 B2 | 2/2013 | Natarajan et al. | |
| 9,335,936 B2* | 5/2016 | Busick | G06F 3/0611 |
| 10,645,164 B1* | 5/2020 | Malwankar | G06F 3/067 |
| 10,740,003 B2* | 8/2020 | Emma | G06F 3/0685 |

FOREIGN PATENT DOCUMENTS

CN    114649033 A    6/2022

OTHER PUBLICATIONS

"European Application Serial No. 21215712.7, Extended European Search Report dated May 31, 2022", 8 pgs.

* cited by examiner

*Primary Examiner* — Idriss N Alrobaye
*Assistant Examiner* — Richard B Franklin
(74) *Attorney, Agent, or Firm* — Schwegman Lundberg & Woessner, P.A.

(57) ABSTRACT

Various embodiments provide a memory system architecture for heterogeneous memory technologies, which can be implemented by a memory sub-system. A memory system architecture of some embodiments can support servicing an individual command request using different (heterogeneous) memory technologies, such as different types of memory devices (e.g., heterogeneous memory devices), different types of memory device controllers (e.g., heterogeneous memory device controllers), different types of data paths (e.g., data paths with different protocols or protocol constrains), or some combination thereof. According to various embodiments, the memory system architecture uses tracking and management of multiple command responses to service a single command request from a host system.

20 Claims, 11 Drawing Sheets

MEMORY SYSTEM ARCHITECTURE FOR HETEROGENEOUS MEMORY TECHNOLOGIES

TECHNICAL FIELD

Embodiments of the disclosure relate generally to memory devices and, more specifically, to a memory system architecture comprising heterogeneous memory devices, which can be implemented by a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
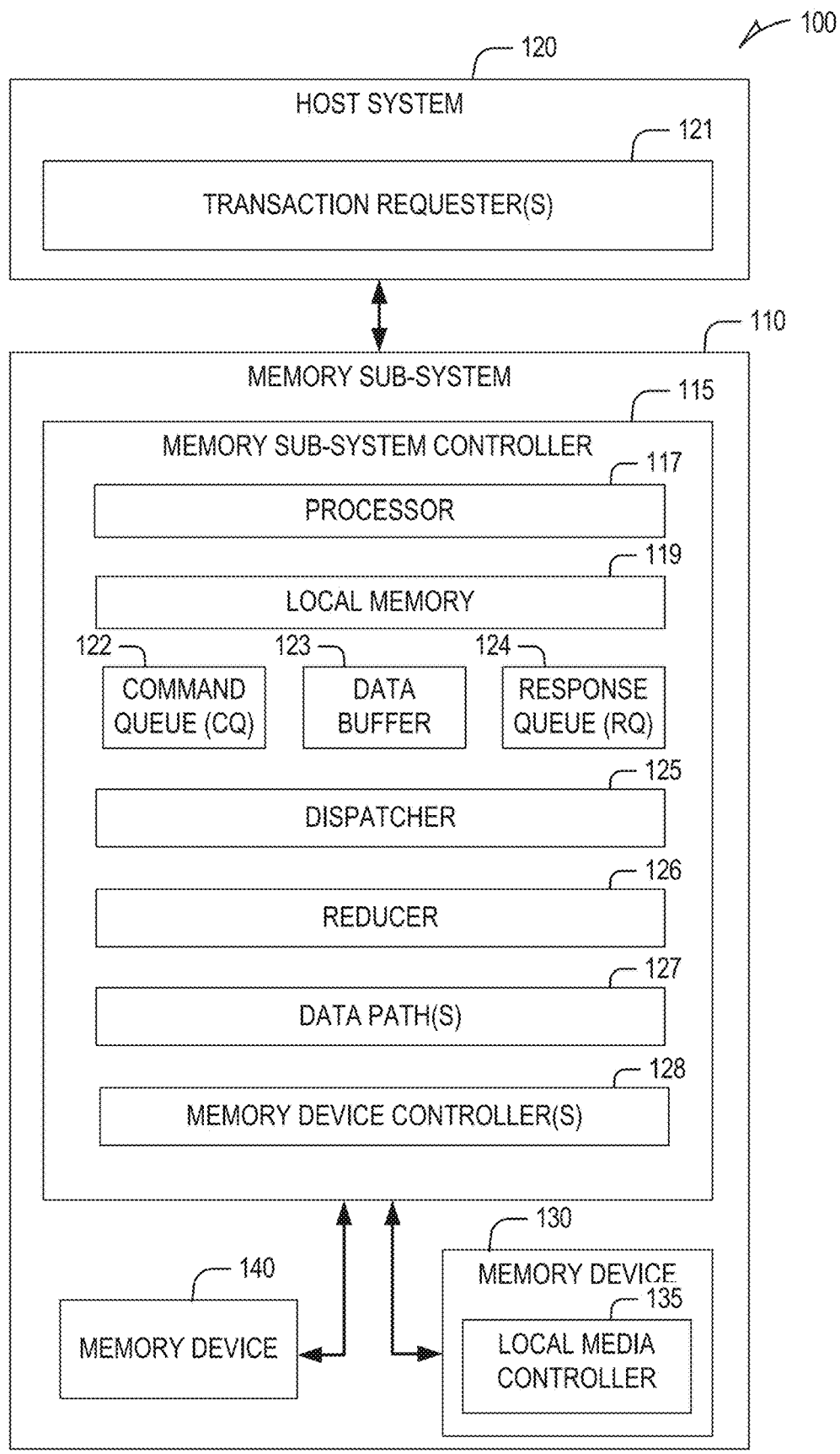
FIG. 1 is a block diagram illustrating an example computing system that includes a memory sub-system, in accordance with some embodiments of the present disclosure.

Aspects of the present disclosure are directed to a memory system architecture for heterogeneous memory technologies, which can be implemented by a memory sub-system.

A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., error-correcting code (ECC) codeword, parity code), data version used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table (also referred to herein as a L2P table), data from logging, scratch pad data, and so forth).

A memory device can be a non-volatile memory device. A non-volatile memory device is a package of one or more die. Each die can be comprised of one or more planes. For some types of non-volatile memory devices (e.g., negative-and (NAND)-type devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package. A memory device can also be a volatile memory device, which can be a package of one or more die. Examples of volatile memory devices include, without limitation, random access memory (RAM) such as dynamic random access memory (DRAM).

As the complexity of digital architectures increases, so does the need for various applications to operate concurrently with maximum efficiency, while considering their own distinctive computational, memory and storage requirements. Heterogeneous memory technologies are commonly employed to accommodate different usage scenarios (e.g., operation of different concurrent applications). For instance, in applications that use a solid-state drive, the solid-state drive can comprise multiple negative-and (NAND) type memory die that are coupled to one or more dynamic random access memory (DRAM)-based caches. In comparison, for mobile device applications smartphones), a memory system can comprise a number of small memory modules that have lower power consumption and cost less to manufacture.

In general, a memory system (e.g., memory sub-system) implementing a traditional memory architecture processes one or more memory transactions that are initiated by one or more transaction requesters, such as software applications operating on a hardware accelerator (e.g., a central processing unit (CPU)), and that are directed to one or more transaction executors (e.g., transaction servicers or responders), such as memory controllers (e.g., memory sub-system controllers) or memory modules. Usually, the intent of those memory transactions is to move data, such as reading data from a memory component or writing data to the memory component. A traditional memory architecture often implements the processing, management, and routing logic for data and command information to be transferred between the transaction requesters and the transaction servicers to facilitate execution of memory transactions.

Aspects of the present disclosure provide for a memory system architecture that can support servicing an individual command request using different (heterogeneous) memory technologies, such as different types of memory devices (e.g., heterogeneous memory devices), different types of memory device controllers (e.g., heterogeneous memory device controllers), different types of data paths (e.g., data paths with different protocols or protocol constrains), or some combination thereof. According to various embodiments, the memory system architecture uses tracking and management of multiple command responses (hereafter, referred to sub-responses) to service a single command request from a host system. By use of a memory system architecture of an embodiment, a memory system (e.g., memory sub-system) can facilitate use of heterogeneous memory technologies (e.g., a combinations of different types of memory device, different types of data paths, different types of memory device controllers, or some combination thereof) to support applications having different memory needs or requirements. For instance, a memory system architecture of an embodiment can facilitate execution of hardware/software applications that need or desire a flexible amount of data movement in a memory system where multiple heterogeneous memory technologies coexist.

In particular, various embodiments provide for a memory system architecture comprising: a command queue to receive a single command request from a host system; a dispatcher to generate multiple command sub-requests (e.g., sub-commands) based on the single command request, and to send (e.g., forward) the multiple command sub-requests (e.g., representing portions of the single command request) to two or more different data paths to two or more different memory devices; and a response reduction component (hereafter, a reducer) to manage (e.g., receive and track) multiple command sub-responses (e.g., representing partial responses to the single command request) received from the two or more memory devices (over the different paths) in response to the multiple command sub-requests, and to generate a single command response (for the host system) as a response to the single command request. Additionally, for various embodiments, the two or more different data paths are coupled to two or more memory device controllers that are coupled to two or more memory devices; each memory device controller can interface with at least one different type of memory device. According to various embodiments, the multiple command sub-requests (generated by the dispatcher in association with the single command request) can be directed to different (heterogeneous) memory technologies by the dispatcher via the different data paths. In response to the multiple command sub-requests, the multiple command responses from the different (heterogeneous) memory technologies can received by the reducer (in association with the single command request) and combined together in the single command response for the host system. In this way, various embodiments supervise splitting a single command request into multiple command sub-requests, execution of the multiple command sub-requests, and merging of outcomes of the multiple command sub-requests into a single command response for the host system. The multiple command sub-responses can represent partial responses for responding to the single command request from the host system.

Each different data path can represent a different memory technology, such as a different type of data communication standard (e.g., interconnect protocol), a different type of memory device controller, a different type of memory device, or some combination thereof. For instance, a first data path and a second data path can be coupled to two separate memory device controllers that differ in type. In another instance, a first data path and a second data path can be coupled to the same (single) memory device controller, but where each of the data paths can either: use a different data communication standard (e.g., Peripheral Component Interconnect Express (PCIe) and Serial ATA (SATA)); use the same data communication standard (e.g., PCIe) with different parameters (e.g., data packets having different data size); or interface with a memory device of a different type (e.g., NAND-type single level cell (SLC) memory device, NAND-type triple level cell (TLC) memory device, or three-dimensional cross-point memory device) coupled to the single memory device controller.

As used herein, response reduction component and reducer are used interchangeably. As used herein, a memory system can comprise a memory sub-system as described herein. As used herein, heterogeneous memory devices can comprise multiple memory devices where at least two memory devices are of a different type. For instance, a set of heterogeneous memory devices can comprise at least one NAND-type SLC memory device, at least one NAND-type TLC memory device, and at least one three-dimensional cross-point memory device.

As used herein, a command request to a memory system (e.g., memory sub-system) can comprise a data read request (e.g., read command) or a data write request (e.g., write command) to the memory sub-system, where the data read request or the data write request has an associated memory address e.g., logical memory address or physical memory address) that is included with the request. As used herein, each sub-request can represent a sub-command or a packet, and each sub-response can represent a partial response or a partial outcome.

For various embodiments, a memory architecture described herein is implemented with respect to a memory system (e.g., memory sub-system) using hardware (e.g., hardware logic), software (e.g., firmware logic), or some combination thereof.

Disclosed herein are some examples of memory system architectures for heterogenous memory technologies, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory device controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a SATA interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single-level cells (SLCs), can store one bit per cell. Other types of memory cells, such as multi-level cells (MLCs), TLCs, quad-level cells (QLCs), and penta-level cells (PLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller local media controller 135) for media management within the same memory device package. An example of a managed memory device is a managed NAND (MNAND) device.

The host system 120 includes one or more transaction requesters 121, which can represent hardware or software applications on the host system 120 that can generate a command request for processing by the memory sub-system 110. As described herein, a command request can comprise a read request (e.g., read command) or a write request (e.g., write command) that can include an associated memory address of the memory sub-system 110 (e.g., logical memory address or a physical memory address of the memory sub-system 110). Where the command request comprises a write request, the command request can comprise data to be written to the associated memory address, or the data can be communicated to the memory sub-system 110 separate from the write request (e.g., over a data interface or channel that is separate from a command interface or channel).

The memory sub-system controller 115 includes a command queue 122 (hereafter, CQ 122), a data buffer 123, a response queue 124 (hereafter, RQ 124), a dispatcher 125, a reducer 126, one or more data paths 127 (hereafter, data paths 127), and one or more memory device controllers 128 (hereafter, memory device controllers 128). Depending on the embodiment, one or more of the CQ 122, the data buffer 123, the RQ 124, the dispatcher 125, the reducer 126, the data paths 127, and the memory device controllers 128 can form part of the memory sub-system controller 115 (as shown in FIG. 1) or can be external/separate from the memory sub-system controller 115.

For some embodiments, the CQ 122 is configured to receive one or more command requests (e.g., read requests or write requests) from the host system 120. Additionally, the data buffer 123 of some embodiments can stage data for write requests received through the CQ 122, and can accept data for read requests received through the CQ 122. The data buffer 123 can represent a generic data staging mechanism. The CQ 122 can send or provide requests stored in the CQ 122 to the dispatcher 125 according to one or more policies. Each command request received from the host system 120 by the CQ 122 can cause generation of a command queue entry in the CQ 122. A command queue entry of a command request can comprise a command queue identifier that identifies (e.g., uniquely identifies) the command request within the CQ 122 and additionally, that can identify (e.g., uniquely identify) the command request within the memory sub-system 110. The command queue identifier for the command request can be provided by the host system 120 or can be generated by the memory sub-system 110 (e.g., by the CQ 122) upon receiving the command request. The command queue entry of the command request can comprise a memory address (hereafter, command memory address) associated with the command request; the memory address can be a target memory address for a write request or a source memory address for a read request. The command queue entry of the command request can comprise a designation (e.g., field that designates) the type of command request represented by the command queue entry. The command queue entry of the command request can comprise data to be used by the command request represented by the command queue entry. For instance, in a command queue entry for a write request, the data can be the data to be written to the memory sub-system 110 by the write request. Additionally, depending on the embodiment, the command queue entry of the command request can comprise additional information with respect to a command request received from the host system 120.

According to some embodiments, the RQ 124 is configured to receive one or more command responses provided by the reducer 126, where each of the command responses is associated with (e.g., corresponding to and in response to) at least one command request received by the CQ 122 from the host system 120. For instance, a single command request received by the CQ 122 can eventually result in a single command response being generated by the reducer 126 and provided to the RQ 124. For various embodiments, the RQ 124 provides one or more command responses to the host system 120, where the RQ 124 can send the command responses to the host system 120 or enable the host system 120 to retrieve the command responses from the RQ 124. Each command response received from the host system 120 by the CQ 122 can cause generation of a response queue entry in the RQ 124. A response queue entry of a command response can comprise a response queue identifier that identifies (e.g., uniquely identifies) the command response within the RQ 124 and, additionally, that can correspond to (e.g., match) a command queue identifier of a command request (received by the CQ 122) to which the command response is responding. In this way, the host system 120 can match the command response from the RQ 124 to a command request that the host system 120 sent to the CQ 122. The response queue entry of the command response can comprise an outcome, which can indicate whether the memory sub-system 110 successfully executes/processes a command request (received by the CQ 122) to which the command response is responding. The outcome can indicate an overall success or failure of execution/processing of the command request, or can indicate success or failure of individual sub-requests executed/processed for the command request. The outcome can be determined (e.g., generated or updated) by the reducer 126 based on one or more command sub-responses the reducer 126 receives from the data paths 127 (sub-responses generated by the memory device controllers 128 by interacting with the memory devices 130, 140) in response to one or more command sub-requests the dispatcher 125 sends to the data paths 127 (sub-requests for processing the memory device controllers 128). The response queue entry of the command response can comprise data provided (e.g., by one or more of the memory devices 130, 140) in response to a command request to which the command response is responding. For instance, in a command queue entry for a read request, the data can be the data to read from one or more of the memory devices 130, 140 of the memory sub-system 110. The data in the command response can represent or comprise a collection of data provided by two or more read sub-responses received from the data paths 127 by the reducer 126 in response to two or more read sub-requests sent to the data paths 127 by the dispatcher 125. Additionally, depending on the embodiment, the response queue entry of the command response can comprise additional information with respect to a command response provided by (e.g., generated by) the reducer 126.

In various embodiments, the dispatcher 125 is configured to receive (or retrieve) one or more command requests from the CQ 122. For an individual command request from the CQ 122, the dispatcher 125 of some embodiments generates a plurality of command sub-requests based on the individual command request. For instance, where the individual command request comprises a read request, the dispatcher 125 can generate a plurality of read sub-requests for two or more memory devices (e.g., 130, 140) of the memory sub-system 110. An individual read sub-request, generated for an individual memory device of the memory sub-system 110, can comprise a source memory address (e.g., logical or physical memory address) corresponding to a location (e.g., physical location) on the individual memory device from which data is to be read. In another instance, where the individual command request comprises a write request for writing specific data (e.g., provided by a command queue entry for the write request in the CQ 122) to the memory sub-system 110, the dispatcher 125 can generate a plurality of write sub-requests for two or more of memory devices (e.g., 130, 140) of the memory sub-system 110. An individual write sub-request, generated for an individual memory device of the memory sub-system 110, can comprise data to be written to the individual memory device, and a target memory address (e.g., logical or physical memory address) corresponding to a location on the individual memory device where the data is to be written. For an individual write sub-request generated for a write request (from the host system 120) to write select data, data to be written by the individual sub-request can comprise or represent a portion (e.g., sub-set) of the select data requested for writing by the write request.

Eventually, the dispatcher 125 of various embodiments sends (or forwards) each command sub-request from the plurality of command sub-requests to one or more memory devices (e.g., 130, 140) of the memory sub-system 110 via one or more of the data paths 127 associated with those memory devices. As noted herein, the one or more data paths 127 are operably coupled to one or more of the memory device controllers 128 associated with those memory devices. For example, a first command sub-request (from the plurality of command sub-requests) for a first memory device of the memory sub-system 110 can be sent by the dispatcher 125 to the first memory device via a first data path (of the data paths 127) for interacting with the first memory device, where the first data path is operably coupled to a first memory device controller (of the memory device controllers 128) that is operable coupled to the first memory device. A second command sub-request (from the plurality of command sub-requests) for a second memory device of the memory sub-system 110 can be sent by the dispatcher 125 to the second memory device via a second data path (of the data paths 127) for interacting with the second memory device, where the second data path is operably coupled to either the same, first memory device controller or a different, second memory device controller (of the memory device controllers 128) that is operably coupled to the second memory device. In this way, each command sub-request generated by the dispatcher 125 can be targeted for a different memory device having a different data path. Eventually, one or more command sub-responses can be received from (e.g., returned by) one or more data paths of the data paths 127 for an individual command sub-request sent via an individual data path of the data paths 127. Additionally, where an individual command sub-request is sent to a select memory device via a select data path of the data paths 127, one or more command sub-responses generated in response to the individual command sub-request can be received via the same, select data path.

For some embodiments, the reducer 126 is configured to receive one or more command sub-responses from one or more data paths of the data paths 127. For instance, the reducer 126 can receive a first command sub-response (e.g., from a first data path of the data paths 127) in response to a first command sub-request (e.g., sent via the first data path) to a first memory device (e.g., 130) of the memory sub-system 110, and can receive a second command sub-response (e.g., from a second data path of the data paths 127) in response to a second command sub-request to a second memory device (e.g., 140) of the memory sub-system 110. The reducer 126 can receive individual command sub-responses, and determine an association between each individual command sub-response and a command request originally received by the memory sub-system 110 (via the CQ 122) from the host system 120. Based on one or more command sub-responses received (by the reducer 126) in response to one or more command sub-requests for an individual command request, the reducer 126 of some embodiments generates a single command response (e.g., a final reduced command response). For instance, the reducer 126 can receive two or more read sub-responses that are associated with (e.g., that correspond to) an individual read request from the host system 120 to read select data from the memory sub-system 110, where the two or more read sub-responses are responsive to two or more read sub-requests associated with (e.g., corresponding to) the individual read request to read the select data. Each of the read sub-responses can comprise a portion of the select data being requested by the host system 120 via the individual read request. Based on the two or more read sub-responses, the reducer 126 can generate a single read response for the individual read request; the single read response can be provided to the host system 120 via the RQ 124. In another instance, the reducer 126 can receive two or more write sub-responses that are associated with (e.g., that correspond to) an individual write request from the host system 120 to write select data to the memory sub-system 110, and where the two or more write sub-responses are responsive to two or more write sub-requests associated with (e.g., corresponding to) the individual write request to write the select data. Each of the write sub-responses can comprise a portion of the select data to be written to one of the memory devices of the memory sub-system 110. Additionally, each of the write sub-responses can comprise a status indicating whether a corresponding write sub-request was successfully executed/processed by one of the memory device controllers 128. Depending on the embodiment, an individual command sub-request sent by the dispatcher 125 (via an individual data path of the data paths 127) can result in one or more command sub-responses being generated and returned to the reducer 126.

According to various embodiments, the dispatcher 125 is configured to negotiate with the reducer 126 to add sub-response tracking for one or more command sub-responses the reducer 126 receives in association with (e.g., corresponding to) an individual command request. For instance, for an individual read request from the host system 120, the dispatcher 125 can negotiate with the reducer 126 to add sub-response tracking for one or more read sub-responses received by the reducer 126 in association with the individual read request. In another instance, for an individual write request from the host system 120, the dispatcher 125 can negotiate with the reducer 126 to add sub-response tracking for one or more write sub-responses received by the reducer 126 in association with the individual read request.

For some embodiments, the dispatcher 125 negotiates with the reducer 126 to add sub-response tracking for an individual command request by: sending to the reducer 126 a tracking request to add sub-response tracking for the individual command request; and receiving a tracking response from the reducer 126 in response to the tracking request. The dispatcher 125 can generate the plurality of command sub-requests (for the individual command request) based on the individual command request and the tracking response from the reducer 126. The tracking request can comprise a command identifier (e.g., command queue identifier) associated with the individual command request, and a command memory address (e.g., target or source memory address) associated with the individual command request. Additionally, the tracking request can comprise a query asking the reducer 126 whether the reducer 126 is capable of adding (e.g., has sufficient memory resources available to add) sub-response tracking for the internal command request.

In response to the tracking request, the reducer 126 can generate and return a tracking response that comprises an indication of whether sub-response tracking was successfully added for the individual command request. Additionally, the tracking response can comprise a tracking identifier (e.g., unique tracking identifier) assigned to the individual command request by the reducer 126, and used by the reducer 126 to track sub-responses the reducer 126 receives in association with (e.g., in connection with) the individual command request. The dispatcher 125 can be configured to use the tracking identifier provided (by the reducer 126) via the tracking response for the individual command request in each command sub-request the dispatcher 125 generates and sends (to one or more of the data paths 127) for the individual command request. For some embodiments, each command sub-response generated in response to an individual command sub-request includes a tracking identifier of the individual command sub-request. In this way, for each individual command sub-response received by the reducer 126, the reducer 126 can use a tracking identifier included by the individual command sub-response to determine an association between the individual command sub-response and one of the individual command requests the reducer 126 is currently sub-response tracking. Additionally, based on such determinations, the reducer 126 can track (e.g., monitor or collect) data or results from each individual command sub-response according to their respective associations with individual command requests.

Accordingly, for some embodiments, after receiving a first command sub-response, the reducer 126 is configured to: read a first tracking identifier from (e.g., a command sub-response tracking identifier included by) the first command sub-response; identify, based on the first tracking identifier, a mapping entry in the mapping memory associated with a first command request; and update the mapping entry based on the first command sub-response. The mapping entry can be identified, for example, by matching the tracking identifier associated with the mapping entry for the first command request, with the first tracking identifier from the first command sub-response. After receiving a second command sub-response, the reducer 126 is configured to: read a second tracking identifier from the second command sub-response; identify, based on the second tracking identifier, a mapping entry in the mapping memory associated with a second command request, where the second command request is different from the first command request; and update the mapping entry based on the second command sub-response.

For some embodiments, the tracking identifier provided by the reducer 126 for an individual command request comprises an identifier (e.g., tag) that is based on a memory address corresponding to a location (e.g., physical location) of memory (e.g., mapping memory) used by the reducer 126 in association with the individual command request (e.g., used to track data or information from command sub-responses received in association with the individual command request). Additionally, for some embodiments, the dispatcher 125 uses the tracking identifier from the tracking response in place of the original command identifier (e.g., the command queue identifier) in each of the command sub-requests generated and sent by the dispatcher 125, and each of the command sub-responses received by the reducer 126. By using the tracking identifier in place of the original command identifier, some embodiments described herein can be interoperable with traditional memory device controllers or traditional memory devices that already support receiving requests and sending responses that include a command identifier (e.g., a command queue identifier).

According to some embodiments, the reducer 126 uses a mapping memory to track command sub-responses, where the mapping memory can be part of or external to the reducer 126. For instance, the mapping memory can be random access memory (RAM) of the reducer 126. The reducer 126 can store a command identifier (provided via a tracking request from the dispatcher 125) for an individual command request in the mapping memory. Additionally, the reducer 126 can store a command memory address (provided via a tracking request from the dispatcher 125) for an individual command request in the mapping memory. For some embodiments, the reducer 126 stores a command identifier (e.g., command queue identifier) for the individual command request and a command memory address for the individual command request in an entry (hereafter also referred to as a mapping entry) stored on the mapping memory. Depending on the embodiment, a mapping entry for an individual command request can comprise information for tracking the individual command request. For instance, the mapping entry can comprise one or more of: a command identifier (e.g., command queue identifier) from the individual command request; a command memory address from the individual command request; command sub-response information collected from command sub-responses received by the reducer 126 for the individual command request; a current status (e.g., outcome of success or failure) for the individual command request, where the current status is updated based on at least one command sub-response received by the reducer 126 for the individual command request; a count of command sub-requests generated by the dispatcher 125 for the individual command request (e.g., the count of command sub-requests representing a split number); and a command sub-response counter for the individual command request, where the command sub-response counter tracks how many command sub-responses have been received by the reducer 126 for the individual command request. The command sub-response information from the memory entry can eventually be used by the reducer 126 (e.g., included by the reducer 126) in a single command response that the reducer 126 generates and provides to the RQ 124 for the individual command request.

As part of the dispatcher 125 negotiating with the reducer 126, the dispatcher 125 can determine a count of command sub-requests in a plurality of command sub-requests generated by the dispatcher 125 for an individual command request, and the dispatcher 125 can inform the reducer 126 regarding the count of command sub-requests (e.g., the dispatcher 125 can communicate the count to the reducer 126). The reducer 126 can store the count of command sub-requests (provided by the dispatcher 125) in a mapping entry for the individual command request (e.g., by updating the mapping entry), where the mapping entry can be stored on the mapping memory used by the reducer 126.

The reducer 126 can use the mapping entry tracking command sub-responses (e.g., monitoring or collecting data from command sub-responses) received by the reducer 126 for the individual command request. The mapping entry can be generated and stored on the mapping memory in response to the reducer 126 receiving and granting a tracking request from the dispatcher 125 for the individual command request.

For some embodiments, the reducer 126 generates a single command response for an individual command request by: determining whether a mapping entry for an individual command request indicates that a condition for generating a single command response (for the individual command request) has been satisfied; and generating the single command response for the host system 120 based on one or more command sub-responses received by the reducer 126 for the individual command request. For instance, where the mapping entry (in the mapping memory) for the individual command request comprises a count of command sub-requests generated by the dispatcher 125 for the individual command request, and comprises a command sub-response counter for the individual command request, the condition for generating the single command response for the individual command request can comprise that the command sub-response counter in the mapping entry for the individual command request equals the count of command sub-requests of the mapping entry.

For some embodiments, the data paths 127 comprise two or more data paths where each data path can be used to interact with different memory devices (e.g., 130 and 140). For instance, a first data path of the data paths 127 can be used to interact with the memory device 130, and a second data path of the data paths 127 can be used to interact with the memory device 140. As described herein, interaction with an individual memory device can comprise communicating a command sub-request to, or communicating a command sub-response from, the individual memory device as described herein. For some embodiments, the data paths 127 operably couple the dispatcher 125 and the reducer 126 to the memory device controllers 128, and the memory device controllers 128 are coupled to the memory devices 130, 140. Each of the data paths 127 can comprise one or more physical connections (e.g., interconnections, connections, a bus) and physical interfaces. According to various embodiments, the dispatcher 125 interacts with one or more of the memory devices 130, 140 via one or more of the data paths 127 and via one or more of the memory device controllers 128; this can enable the dispatcher 125 to send a command sub-request to one of the memory devices 130, 140. Additionally, according to various embodiments, the reducer 126 interacts with one or more of the memory devices 130, 140 via one or more of the data paths 127 and via one or more of the memory device controllers 128; this can enable the reducer 126 to receive a command sub-response from one of the memory devices 130, 140.

Each of the data paths 127 can represent a different memory technology, such as a different type of data communication standard (e.g., interconnect protocol), a different type of memory device controller, a different type of memory device, or some combination thereof. For instance, a first data path and a second data path can be coupled to two separate memory device controllers that differ in type. In another instance, a first data path and a second data path can be coupled to the same (single) memory device controller, but where each of the data paths can either: use a different data communication standard (e.g., PCIe and SATA); use the same data communication standard (e.g., PCIe) with different parameters (e.g., data packets having different data size); or interface with a memory device of a different type (e.g., NAND-type SLC memory device, NAND-type TLC memory device, or 3D cross-point memory device) coupled to the single memory device controller.

For some embodiments, each individual memory device controller of the memory device controllers 128 is configured to receive, from a data path of the data paths 127, a command sub-request (e.g., read request or write request) for an individual memory device (e.g., 130 or 140) operably coupled to the individual memory device controller. The individual memory device controller can be operably coupled to two or more memory devices (e.g., both 130 and 140), and the data path providing the command sub-request for the individual memory device can be exclusively associated with the individual memory device. The individual memory device controller can execute the command sub-request with respect to the individual memory device (e.g., perform a read or write operation per the command sub-request). The individual memory device controller can generate a command sub-response (e.g., data read from the memory device or write operation outcome) based on executing the command sub-request on the individual memory device, and send the command sub-response as a response to the command sub-request. The individual memory device controller can send the command sub-response for the command sub-request using the same data path upon which the individual memory device controller received the command sub-request.

Figure 2:
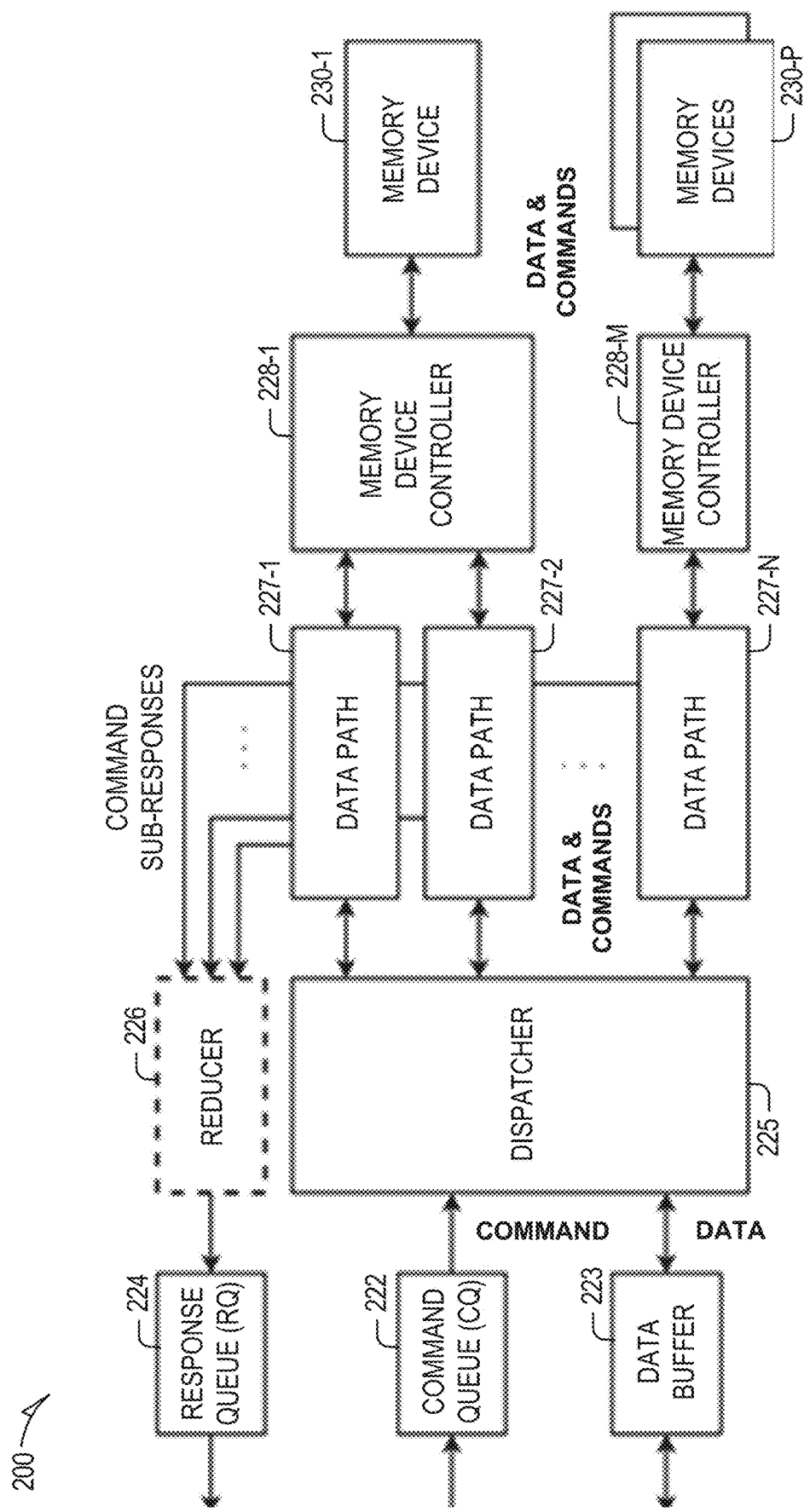
FIGS. 2 and 3 are diagrams illustrating example memory architectures, in accordance with some embodiments of the present disclosure.
Figure 3:
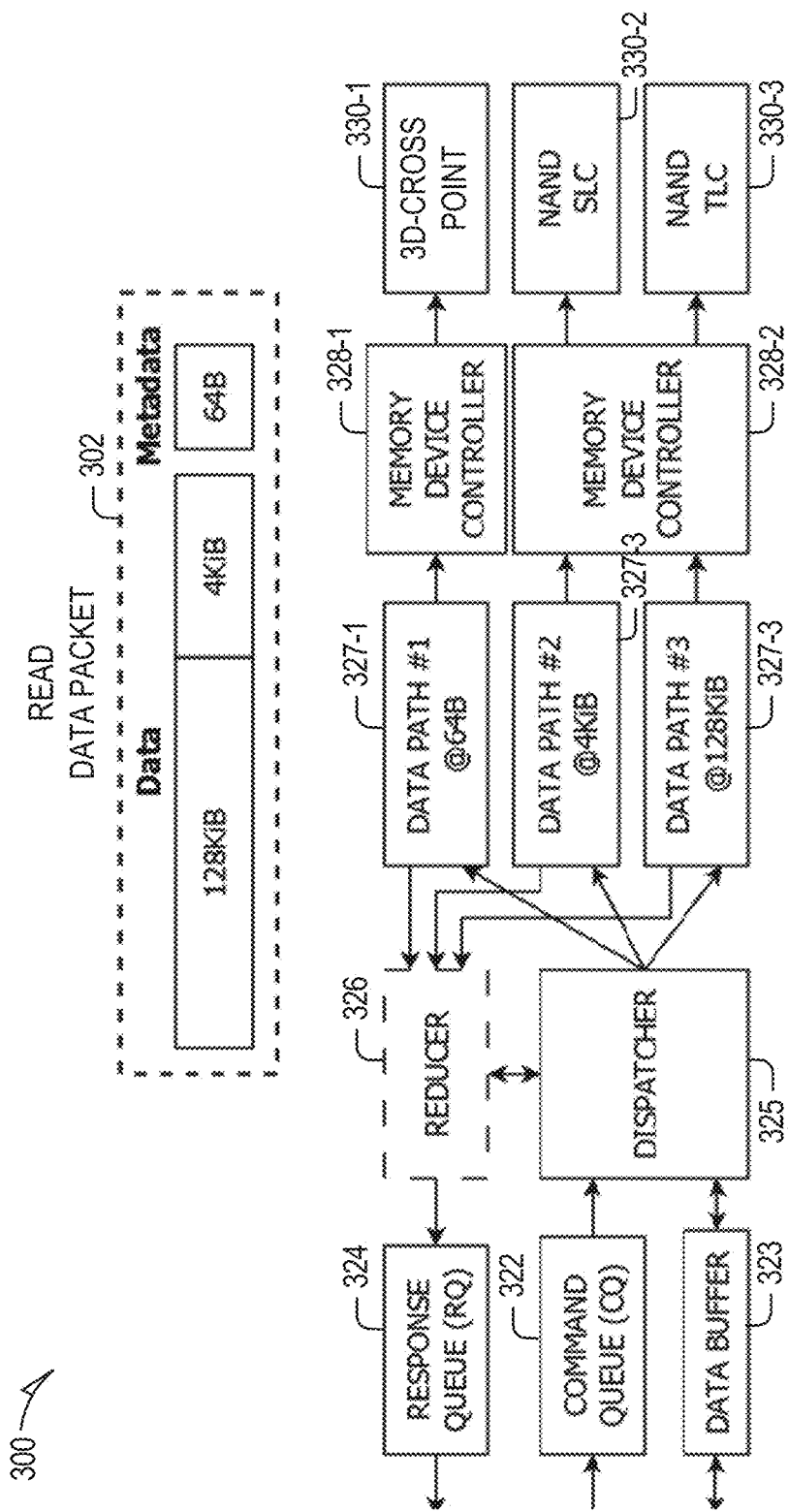

FIGS. 2 and 3 are diagrams illustrating example memory architectures 200 and 300, in accordance with some embodiments of the present disclosure. The memory architecture 200 can process memory requests received from a host system (e.g., 120). The memory architecture 200 can be used to implement different types of memory systems. As shown, the memory architecture 200 comprises a command queue (CQ) 222, a data buffer 223, a response queue (RQ) 224, a dispatcher 225, a reducer 226, data paths 227-1 through 227-N (collectively referred to as data paths 227), memory device controllers 228-1 through 228-M (collectively referred to as memory device controllers 228), and memory devices 230-1 through 230-P (collectively referred to as memory devices 230). For some embodiments, the CQ 222, the data buffer 223, the RQ 224, the dispatcher 225, the reducer 226, the data paths 227, and the memory device controllers 228 are respectively similar to the CQ 122, the data buffer 123, the RQ 124, the dispatcher 125, the reducer 126, the data paths 127, and the memory device controllers 128 described with respect to FIG. 1.

The CQ 222 can stage command requests that come from one or more host systems (e.g., 120). The CQ 222 can comprise a buffer, which can be memory-mapped across a system interconnect. The RQ 224 can stage command responses (to the command requests), where each command response can store information about an outcome of each command request.

The reducer 226 can receive and combine command sub-responses into single command responses that respond to command requests from a host system (e.g., 120). As described herein, the command sub-responses can result from command sub-requests processed by the memory architecture 200, where a plurality of command sub-requests can be generated (by the dispatcher 225) for an individual command request. Additionally, the reducer 226 can control concurrent access to the RQ 224. More regarding operation of the reducer 226 is described herein with respect to FIG. 3.

The dispatcher 225 can receive an individual command request, generate a plurality of command sub-requests, and route individual command sub-requests from the plurality to one or more of the data paths 227. Accordingly, the dispatcher 225 can split a command request into multiple command sub-requests and forward each of the command sub-requests to the data paths 227, where a first command sub-request intended for processing/execution by a first memory device is forwarded to a first data path of the data paths 227, and a second command sub-request intended for processing/execution by a second memory device is forwarded to a second data path of the data paths 227 that is different from the first data path. The routing of command sub-requests by the dispatcher 225 to different data paths can be performed according one or more policies (e.g., by memory address, by identifiers, or implicitly).

One or more of the data paths 227 can convey data (e.g., read sub-requests or write sub-requests) from the dispatcher 225 to one or more of the memory devices 230 via one or more of the memory device controllers 228. Each of the data paths 227 can flow command sub-requests from the dispatcher 225 to one or more of the memory device controllers 228, and can flow command sub-responses from the one or more of the memory device controllers 228 to the reducer 226. One or more of the memory device controllers 228 can comprise a technology-independent portion scheduling execution of command sub-requests, and a technology-dependent portion, which can perform pin-level interactions with one or more of the memory devices 230.

The data buffer 223 can implement a generic data staging facility for the memory architecture 200. For instance, the data buffer 223 can stage data for a write request from a host system, and can accept data in connection with a read request from the host system.

During operation, a host system (e.g., 120) can express intent to access the memory architecture 200 (e.g., a memory system implementing the memory architecture 200) by posting a command request (e.g., a well-formed message) into the CQ 222 and then waiting for a command response e.g., proper response) to appear in the RQ 224. For a write request from the host system, the write request is accompanied with data that flows from the host system to the memory architecture 200. For a read request from the host system, data flows from the memory architecture 200 to the host system. For write requests or read requests, a command response can be generated (by the reducer 226) in response to the write request or the read request being serviced by the memory architecture 200. A command response generated by the memory architecture 200 for a write request can be generated without waiting for data to be transferred to one of the memory devices 230 (e.g., generated as soon as one of the memory device controllers 228 executes a write sub-request generated based on the write request). A command response generated by the memory architecture 200 for a read request can be generated after data is correctly received (e.g., data is correctly received via read sub-responses) from one or more of the memory devices 230. For some embodiments, command sub-responses for reads and writes are conveyed via the data paths 227.

Table 1 describes example fields for an entry (e.g., command queue entry) in the CQ 222 for a command request received from a host system for processing/servicing by the memory architecture 200. The identifier (ID) field can store an identifier (e.g., representing a command queue identifier)

to recognize an outstanding command request received from a host system; the identifier can uniquely identify a command request within the CQ 222 or uniquely identify the command request within the memory architecture 200. The identifier can be assigned to the command request by the CQ 222, by another component of the memory architecture 200, or by the host system sending the command request. A command request is considered in-flight if its command response has not yet been generated by the memory architecture 200 or if its command response has been generated in the RQ 224, but not yet consumed by the host system. The address field can store a command memory address for the command request (e.g., target memory address for a write request or a source memory address for a read request). The type field can indicate the type of command request represented by the command queue entry (e.g., read command request or write command request). The data field can store a data payload that accompanies the command request (e.g., with respect to PCIe) or stored in one or more set-aside buffers.

TABLE 1

| FIELD | CONTENTS |
| --- | --- |
| ID | Command identifier (e.g., unique identifier within CQ or within memory architecture) of the command request. |
| ADDRESS | Command memory address for the command request (e.g., target memory address for a write request, or a source memory address for a read request). |
| TYPE | Type of command request (e.g., write request or read request) |
| DATA | Data payload for the command request. For instance, the data payload to be sent to a memory device (e.g., data to be written to a command memory address for a write request). |

Table 2 describes example fields for an entry (e.g., response queue entry) in the RQ 224 for a command response to a command request processed/serviced by the memory architecture 200. The format of an entry of the RQ 224 can follow that of an entry of the CQ 222. The identifier (ID) field can store an identifier (e.g., representing a response queue identifier) of the command request to which the command response is responding, where the identifier of the command request can be the same as the identifier used for that command request in the CQ 222. The outcome field can store data indicating a status (e.g., final status) of the command request based on all the command sub-responses received (by the reducer 226) for the command request. For instance, data stored in the outcome field can indicate a success or failure of the command request as ultimately determined by the reducer 226 based on all the command sub-responses received by the reducer 226 for the command request. The data stored in the outcome field can form part of the command response provided to a host system (e.g., 120). The data field can store a data payload included by the command response provided to a host system.

TABLE 2

| FIELD | CONTENTS |
| --- | --- |
| ID | Command identifier (e.g., unique identifier) of the command request to which the command response is responding. |
| OUTCOME | Data indicating a status (e.g., final status) for the command request that the command response is responding to (e.g., can indicate either success or failure of the command request). |

TABLE 2-continued

| FIELD | CONTENTS |
| --- | --- |
| DATA | Data payload included by the command response, for instance, the data payload comprising data retrieved from one or more memory devices (e.g., via one or more read sub-responses for a read request from a host system). |

In an example use case, the memory architecture 200 can be used to implement (at least a part of) a Universal Flash Storage (UFS) memory system for a mobile device. For instance, the memory architecture 200 can implement a memory system composed of two different memory technologies: one or more 3D-crosspoint memory devices (e.g., for quasi-persistent data management) and one or more NAND SLC/TLC memory devices (e.g., for non-volatile data management). In general, such memory devices can have orthogonal performance and page size characteristics (e.g., a 3D-crosspoint memory device generally has a narrow page with high random performance, while the contrary is trued for a NAND-type memory device), which can render the use of both the memory device in a single memory architecture (e.g., 200) beneficial for certain applications (e.g., mobile devices).

For example, three data paths of the data paths 227 of the memory architecture 200 can be used to operate at different data granularities and with two different NAND array configurations (e.g., SLC and TLC). For instance, the data path 227-1 can comprise a first data path configured to 4 kilobyte (KiB) data units (e.g., data chunks), the data path 227-2 can comprise a second data path configured to 128 KiB data units, and the data path 227-N can comprise a third data path configured to carry 64 byte (B) data units. The data path 227-1 and the data path 227-2 are both operably coupled to the memory device controller 228-1. The data path 227-1 can be used in the memory architecture 200 (e.g., by the dispatcher 225 and the reducer 226) to interact with a NAND SLC memory device (that forms part of memory device 230-1). The data path 227-2 can be used in the memory architecture 200 (e.g., by the dispatcher 225 and the reducer 226) to interact with a NAND TLC memory device (that also forms part of memory device 230-1). The data path 227-N is operably coupled to the memory device controller 228-M; the data path 227-N can be used in the memory architecture 200 (e.g., by the dispatcher 225 and the reducer 226) to interact with a 3D-crosspoint memory device (that also forms part of memory devices 230-P).

The same type of command requests (e.g., read requests) can complete on the three memory devices at different times. 3D-crosspoint memory devices can have a lower page size with a simple ECC engine, while NAND-type memory devices can have wider pages and complex ECC engine. In case of errors, retry algorithms for NAND-type memory devices can be complex compared to those for 3D-crosspoint memory devices.

For example, consider the memory architecture 300 of FIG. 3, which like the memory architecture 200 of FIG. 2 can process memory requests received from a host system (e.g., 120). As shown, the memory architecture 300 comprises a command queue (CQ) 322, a data buffer 323, a response queue (RQ) 324, a dispatcher 325, a reducer 326, data paths 327-1 through 327-3 (collectively referred to as data paths 327), memory device controllers 328-1 and 328-2 (collectively referred to as memory device controllers 328), and memory devices 330-1 through 330-3 (collectively referred to as memory devices 330). For some embodiments, the CQ 322, the data buffer 323, the RQ 324, the dispatcher 325, the reducer 326, the data paths 327, and the memory device controllers 328 are respectively similar to the CQ 122, the data buffer 123, the RQ 124, the dispatcher 125, the reducer 126, the data paths 127, and the memory device controllers 128 described with respect to FIG. 1.

Referring now to FIG. 3, a read request (from a host system) that comprises a read data packet 302 that includes data section of 132 KiB and a metadata section of 64 B, where the data section comprises a first data subsection of 128 KiB and a second data subsection of 4 KiB. The dispatcher 325 can receive such a read request from the CQ 322, and generate three read sub-requests, thereby splitting the original read request into three read sub-requests. For instance, a first read sub-request can be generated to comprise the first data section of 128 KiB, a second read sub-request can be generated to comprise the second data section of 4 KiB, and a third read-sub-request can be generated to comprise the metadata section of 64 B. The first read sub-request (comprising 128 KiB) can be sent (e.g., forwarded or routed) by the dispatcher 325 to data path 327-3 (configured for 128 KiB data chunks) to the NAND TLC memory device 330-3, which can provide high memory performance for sequential data traffic and larger page size. The second read sub-request (comprising 4 KiB) can be sent by the dispatcher 325 to data path 327-2 (configured for 4 KiB data chunks) to the NAND SLC memory device 330-2, which can provide high memory performance for smaller page sizes than the NAND TLC memory device 330-3. Lastly, the third read sub-request (comprising 64 B) can be sent by the dispatcher 325 to data path 327-1 (configured for 64 B data chunks) to the 3D-crosspoint memory device 330-1, which can provide the smallest page size of the three memory devices, write-in-place for data pointers, metadata and forced write, or some combination thereof. Eventually, the reducer 326 can receive a command sub-response (e.g., read sub-response) via the data paths 327-1, 327-2, 327-3 for the three read sub-requests sent by the dispatcher 325. The reducer 326 can generate a single command response (e.g., single read response) based on the received command sub-responses, thereby combining/reducing the received command sub-responses to the single command response.

Figure 4:
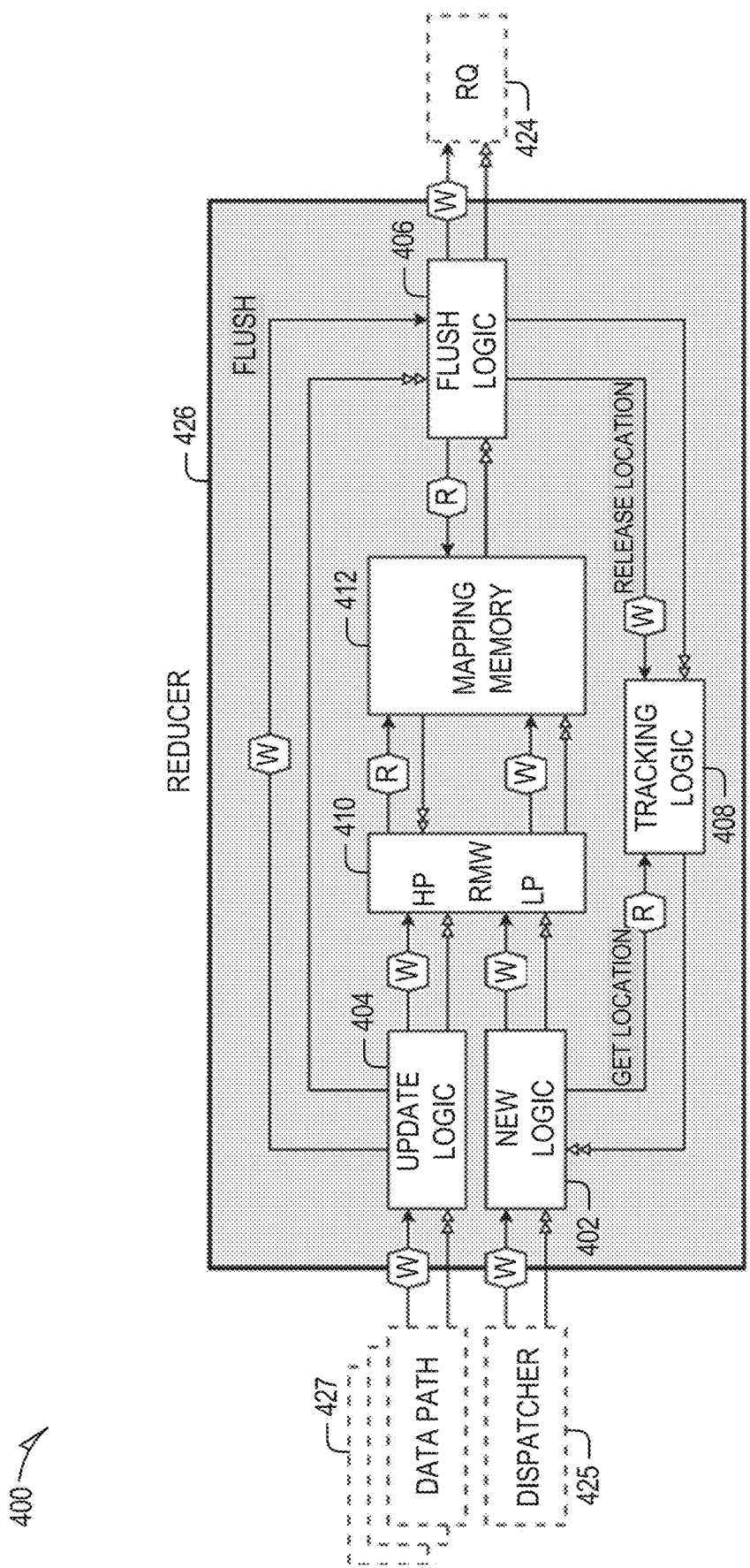
FIG. 4 is a diagram illustrating an example implementation of a response reduction component of a memory architecture, in accordance with some embodiments of the present disclosure.

FIG. 4 is a diagram illustrating an example implementation 400 of a response reduction component (reducer 426) of a memory architecture, in accordance with some embodiments of the present disclosure. In particular, the reducer 426 can represent the reducer 126 of FIG. 1 or the reducer 226 of FIG. 2. FIG. 4 illustrates a dispatcher 425, data paths 427, and a response queue (RQ) 424. According to some embodiments, the dispatcher 425 is similar to either the dispatcher 125 of FIG. 1 or the dispatcher 225 of FIG. 2, the data paths 427 are similar to one of the data paths 127 of FIG. 1 or the data paths 227 of FIG. 2, and the RQ 424 is similar to one of the RQ 124 of FIG. 1 or the RQ 224 of FIG. 2.

As shown, the reducer 426 comprises a new logic 402, an update logic 404, a flush logic 406, a tracking logic 408, and a mapping memory 412. For some embodiments, the mapping memory 412 is used to store information regarding command requests (e.g., in-flight command requests) that are currently being tracked for command sub-responses by the reducer 426. Depending on the embodiment, the mapping memory 412 can comprise one or more random access memory (RAM) devices, which can operate as a shared storage array.

During operation, the new logic 402 can process a new command request based on a request (e.g., tracking request) by the dispatcher 425 to add tracking of command sub-responses for the new command request, and can initialize information (e.g., status information) for tracking command sub-responses for the new command request. The dispatcher 425 can generate and send the request to the new logic 402 of the reducer 426 when the dispatcher 425 receives (e.g., consumes) the new command request from a command queue (e.g., the CQ 122). The update logic 404 can update information (e.g., status information, collected data, and current outcome) for a command request that is currently being tracked for command sub-responses by the reducer 426 and can update that information based on one or more command sub-responses received by the reducer 426 for the command request via the data paths 427. The flush logic 406 can generate a single command response for a command request that is currently being tracked for command sub-responses, where the single command response is generated based on current information (e.g., data collected from received command sub-responses) for the command request. The single command response can represent a single cumulative response generated by reducing the one or more received command sub-responses into the single command response. The tracking logic 408 can assign a new command request (e.g., at the request of the dispatcher 425 via the new logic 402) with an available location on the mapping memory 412 to store information for tracking command sub-responses for the new command request.

For some embodiments, when a new command request is received in a command queue (e.g., the CQ 122) from a host system (e.g., 120), the dispatcher 425 queries the reducer 426 through the new logic 402 to add tracking of command sub-responses for the new command request. The contents of the new command request can be sent to the new logic 402 (e.g., as part of the query), and the dispatcher 425 can expect a query response from the new logic 402 of the reducer 426. A newly formed command request can be sent from the reducer 426 to the dispatcher 425 as a result of the query. After the query is acknowledged with a query response from the new logic 402, the dispatcher 425 can send (e.g., forward) one or more command sub-requests to one or more of the data paths 427. One or more command sub-responses provided by the data paths 427 can be received by the reducer 426 and processed by the update logic 404 as described herein. Eventually, a single command response generated by the reducer 426 (e.g., via the flush logic 406) for the command request can be stored in the RQ 424, from where a host system (e.g., 120) can receive or retrieve the single command response.

Table 3 describes example fields for information stored on the mapping memory 412, which can enable tracking of command sub-responses of command requests (e.g., in-flight command requests still being serviced by the memory architecture). Information stored on the mapping memory 412 can represent a mapping entry for a command request being tracked by the reducer 426 for command sub-responses. The information can track the status of a command request and can include information to be included in a final command response generated (by the reducer 426) for the command request. The format of information stored on the mapping memory 412 can follow at least some of an entry of the RQ 424 (e.g., Table 2), at least some of an entry of a command queue (e.g., the CQ 222, such as Table 1), or some combination thereof.

In Table 3, the identifier (ID) field can store an identifier (e.g., representing a tracking identifier) of the command request for which the reducer 426 can track for command sub-responses, where the identifier can be the same as the identifier used for that command request in a command queue (e.g., 222). The identifier can be provided by the dispatcher 425 (e.g., provided in a tracking request to the reducer 426 from the dispatcher 425). The address field can store a command memory address (e.g., target memory address for a write request or a source memory address for a read request), where the command memory address can be the same as the command memory address stored in a command queue (e.g., 222). The command memory address can be provided by the dispatcher 425 (e.g., provided in a tracking request to the reducer 426 from the dispatcher 425). Depending on the embodiment, data for the identifier field provided by the dispatcher 425, data for the address field provided by the dispatcher 425, or both can represent data copied from a command queue (e.g., the CQ 222). Alternatively, the data for the identifier field provided by the dispatcher 425, data for the address field provided by the dispatcher 425, or both can be copied by the reducer 426 from a command queue directly. The outcome field can store data indicating a current status of the command request based on one or more of the command sub-responses received (by the reducer 226) for the command request. For instance, data stored in the outcome field can indicate the current status of the command request being presently processed/serviced (e.g., in-flight command request) by the memory architecture 200 is a success or a failure. The outcome field can be updated (e.g., by the update logic 404) for a command request as new command sub-responses are received by the reducer 426 for the command request. In this way, the outcome field can merge outcomes from every command sub-response received for a command request. The data stored in the outcome field can eventually form a part of the command response generated by the reducer 426 for the command request and provided to a host system (e.g., 120) via the RQ 424. The data field can store a data payload included by the command response eventually provided to a host system (e.g., 120) via the RQ 424. The counter field can store data indicating how many command sub-responses have been received (thus far) by the reducer 426 (e.g., via the data paths 427) for the command request, which can be updated (e.g., by the update logic 404) for a command request as new command sub-responses are received by the reducer 426 for the command request. The split number field can store data indicating how many command sub-responses the reducer 426 expects to receive for a command request. For some embodiments, the data for the split number field can be determined based on information provided by the dispatcher 425 (e.g., via a tracking request from the dispatcher 425 to the reducer 426). The information from the dispatcher 425 can indicate, for example, how many command sub-requests the dispatcher 425 generated for the command request and that the dispatcher 425 intends to send to the data paths 427 for processing/servicing the command request (e.g., upon the reducer 426 sending a tracking response to the dispatcher 425). Optionally, the split number field can be stored as part of a command queue (e.g., the CQ 122).

TABLE 3

| FIELD | CONTENTS |
| --- | --- |
| ID | Command identifier (e.g., unique identifier) of the command request being tracked for command sub-responses. |

TABLE 3-continued

| FIELD | CONTENTS |
| --- | --- |
| ADDRESS | Command memory address for the command request (e.g., target memory address for a write request, or a source memory address for a read request). |
| OUTCOME | Data indicating a current status for processing/servicing the command request that the command response is responding to (e.g., can indicate either success or failure of the command request). |
| DATA | Data payload to be included by the command response. The data payload can represent data collected from one or more command sub-responses received in connection with a command request. For instance, the data payload comprises data retrieved from one or more memory devices (e.g., via one or more read sub-responses for a read request from a host system). |
| COUNTER | Command sub-response counter for the command request. |
| SPLIT NUMBER | Expected number of command sub-responses for the command request. |

The new logic 402 of some embodiments adds tracking for command sub-responses for a new command request in response to a request (e.g., tracking request) by the dispatcher 425, where the new logic 402 can add the tracking by inserting the new command request in the mapping memory 412. The query (or tracking request) from the dispatcher 425 to the new logic 402 can comprise of a copy of at least some (if not all of) the new command request as received by the dispatcher 425 from a command queue (e.g., the CQ 122), where the copy can comprise at least a command identifier of the new command request and a command memory address of the new command request. The new logic 402 can query the tracking logic 408 for availability of an available memory location (e.g., free slot) in the mapping memory 412 for the new command request. Once an available memory location of the mapping memory 412 is assigned or mapped (e.g., by the tracking logic 408) to the new command request, the tracking logic 408 can return to the new logic 402 a memory address (e.g., physical or logical memory address) of the assigned memory location to which the new command request is mapped. The new logic 402 can then use the returned memory address of the mapping memory 412 to initialize information (e.g., Table 3) for the new command request. For instance, in the location corresponding to the returned memory address for the new command request, the new logic 402 can store (e.g., copy) data for the identifier field and the address field from the new command request (e.g., via the tracking request from the dispatcher 425), can initialize the outcome field and the counter field can be initialized (e.g., to a value of 0), and can set the split number field (e.g., based on a value provided by the dispatcher 425, such as via a tracking request). The new logic 402 can return to the dispatcher 425 the memory address assigned to the new command request, which can indicate that the reducer 426 is now tracking for command sub-responses for the new command request. The new logic 402 can return the memory address to the dispatcher 425 via a tracking response. Additionally, the new logic 402 can return the memory address to the dispatcher 425 by returning to the dispatcher 425 a modified version of the new command request in which an identifier field (e.g., command identifier field) of the command request is overwritten with the memory address assigned to the new command request.

The update logic 404 of some embodiments receives (e.g., consumes) one or more command sub-responses (via the data paths 427) for a command request currently being tracked by the reducer 426. The update logic 404 can stage the command sub-responses received by the update logic 404. Based on the command sub-responses received for the command request, the update logic 404 can update information stored in the mapping memory 412 for the command request. For instance, each command sub-response received by the update logic 404 can include a command identifier that comprises a memory address of the mapping memory 412, where the memory address is one mapped by the reducer 426 (e.g., assigned by the (racking logic 408) to a command request being tracked by the reducer 426. Accordingly, the memory address included in a command sub-response can correspond to a location of the mapping memory 412 where information for a command request (related to the command sub-response) is stored on the mapping memory 412. Accordingly, for a given command sub-response received by the reducer 426 from the data paths 427, the update logic 404 can update information for a command request relating to the given command sub-response based on a memory address of the mapping memory 412 provided by identifier data (e.g., identifier field) included in the given command sub-response. The update logic 404 can update information (stored in the mapping memory 412) for a command request by Read Modify Write (RMW) access of the mapping memory 412 (e.g., read access followed by a write access overwriting slices of data). In response to a given command sub-response received for the command request, the update logic 404 can merge information currently stored in the outcome field with the outcome of the given command sub-response, and can increment the counter field (e.g., by a value of one) to reflect an updated number of command sub-responses received for the command request. The update logic 404 can also compare the split number field with the counter field to determine when a last command sub-response has been received for a command request. For instance, when the update logic 404 determines that the split number field matches the counter field for a command request, the update logic 404 can inform the flush logic 406, which can eventually result in generation of a single command response by the reducer 426 for the command request.

The flush logic 406 of some embodiments receives an indication that a single command response should be generated for a command request based on information stored in the mapping memory 412 for the command request. The flush logic 406 can receive the indication from the update logic 404. Additionally, the flush logic 406 can receive (from the update logic 404) a memory address of the mapping memory 412 assigned (e.g., mapped) to the command request. The memory address can be part of the indication received from the update logic 404. The flush logic 406 can use the memory address to access information for the command request from the mapping memory 412, can generate a single command response for the command request based on the access information, and can store the generated single command response in the RQ 424 (e.g., cause generation of an entry for the single command response in the RQ 424). Based on the information for the command request from the mapping memory 412, the single command response can be generated to include the identifier of the command request (e.g., the command queue identifier copied to the mapping memory 412 for the command request). In doing so, the reducer 426 can restore the original identifier of the command request to the single command response prior to the host system (e.g., 120) receiving the single command response via the RQ 424.

The flush logic 406 can eventually cause the information for the command request to be removed (e.g., evicted) from the mapping memory 412 (e.g., after the single command response for the command request has been generated and stored in the RQ 424). For instance, the flush logic 406 can inform the tracking logic 408 to release the assignment (e.g., mapping) between the command request and location of the mapping memory 412, which can result in information in the mapping memory 412 being removed (e.g., evicted) from the mapping memory 412 and rendering its location in the mapping memory 412 available for tracking another (new) command request).

The tracking logic 408 of some embodiments assigns (e.g., maps) a new command request received by the reducer 426 (e.g., via the new logic 402) to an available location of the mapping memory 412. Additionally, the tracking logic 408 can resolve a location conflict between two or more command requests being tracked for command sub-responses by the reducer 426. The tracking logic 408 can be queried by the new logic 402 in response to the new logic 402 receiving a query (e.g., tracking request) for a new command request from the dispatcher 425. The tracking logic 408 can determine an available location in the mapping memory 412 for tracking command sub-responses for a new command request, and can eventually release a location in the mapping memory 412 assigned to a command request for tracking command sub-responses for the command request.

According to some embodiments, an identifier of a command request comprises a unique identifier. The identifier can be N-bits wide. The mapping memory 412 can comprise $2^k$ locations (e.g., physical locations). Information (e.g., mapping entry) for a command request can be stored in a single row of the mapping memory 412 (e.g., a single row of a RAM device).

For some embodiments, information for a command request can be stored in the mapping memory 412 across a number of rows of the mapping memory 412. For instance, the memory address determined (e.g., by the tracking logic 408) for the command request comprises a logical memory address that maps to a plurality of locations of the mapping memory 412 for storing information for the command request. The tracking logic 408 can, for instance, comprise a command request-to-location mapping function that can map a memory address for a command request to a plurality of locations in the mapping memory 412. For some embodiments, the command request-to-location mapping function (denoted herein as φ) uses an identifier (for command requests) that comprises N-bit identifiers to k-bit locations of the mapping memory 412. The command request-to-location mapping function can be based on, for example, a shared cache of the tracking logic 408, a clustered cache of the tracking logic 408, or a first-in-first-out (FIFO) mechanism of the tracking logic 408. For those command request-to-location mapping functions that use a cache, the cache can store status (e.g., availability) of one or more locations in the mapping memory (e.g., 412) for tracking command sub-responses for command requests. The values of k and N can have an impact on the performance of a tracking logic of some embodiments. For instance, when k is equal to N, the tracking logic 408 can use a command request-to-location mapping function φ that directly maps an identifier of a command request to its assigned location in the mapping memory 412. In another instance, where k is less than N, the tracking logic 408 can use a command request-to-location mapping function φ (e.g., based on a shared cache or a clustered cache) that can resolve mapping conflicts. More regarding an example implementation of the tracking logic 408 that uses a command request-to-location mapping function φ where k is less than N is described with respect to FIG. 5.

Figure 5:
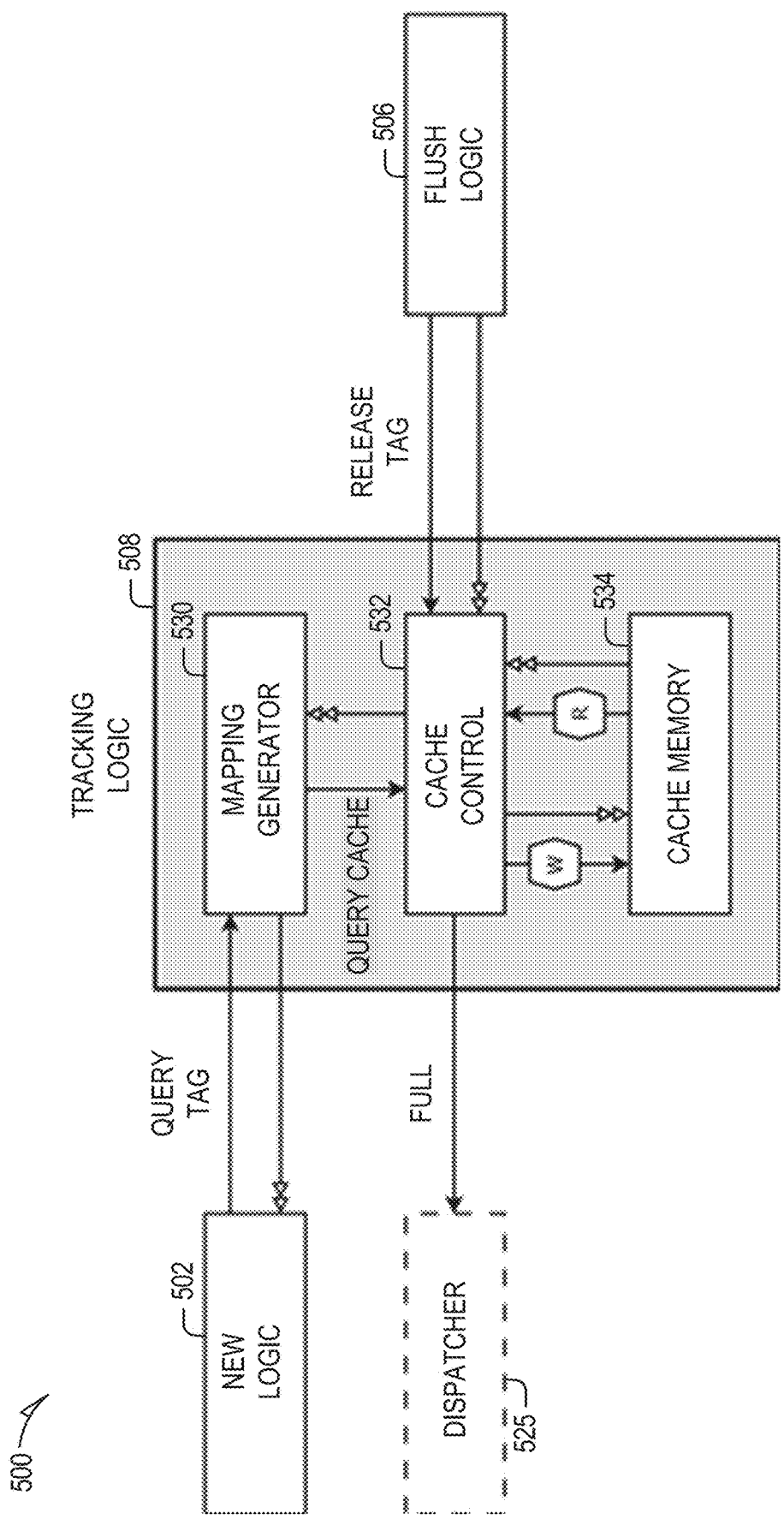
FIG. 5 is a diagram illustrating an example implementation of a tracking logic of a response reduction component, in accordance with some embodiments of the present disclosure.

FIG. 5 is a diagram illustrating an example implementation 500 of a tracking logic 508 of a response reduction component (e.g., reducer 426), in accordance with some embodiments of the present disclosure. In particular, the tracking logic 508 can represent the tracking logic 408 of FIG. 4. According to some embodiments, the new logic 502 is similar to the new logic 402 of FIG. 4, the dispatcher 525 is similar to either the dispatcher 125 of FIG. 1 or the dispatcher 225 of FIG. 2, and the flush logic 506 is similar to the flush logic 406 of FIG. 4. The tracking logic 508 can use a command request-to-location mapping function φ where k is less than N.

As shown, the tracking logic 508 comprises a mapping generator 530, a cache control 532, and a cache memory 534, where the cache memory 534 can comprise a RAM device. For some embodiments, the tracking logic 508 implements a shared cache for implementing a command request-to-location mapping function φ. A shared cache can employ a local caching mechanism to record available locations in a mapping memory (e.g., 412) of a reducer (e.g., 426).

For some embodiments, the mapping generator 530 generates computes) a memory address (e.g., target memory address) of the mapping memory (e.g., 412) as a function of an identifier of a command request. In this way, the mapping generator 530 can implement the command request-to-location mapping function φ. For instance, the mapping generator 530 can compute a k-bit address (e.g., tag) of a memory address of the mapping memory (e.g., 412) as a function of the N-bit input identifier received from the new logic 502 (e.g., provided to the new logic 502) by the dispatcher 525. In doing so, the mapping generator 530 can query the cache control 532 to determine availability of the k-bit memory address (e.g., of the memory address of the mapping memory) based on the N-bit input identifier. For some embodiments, the k-bit address (generated by the mapping generator 530) comprises a tag of a memory address of the mapping memory (e.g., 412), where the tag can comprise the N least significant bits of the command identifier. Accordingly, the tag can become a memory address of the mapping memory (e.g., 412) where the command request shall map to.

The cache control 532 can manage (e.g., dispatch) concurrent accesses to the cache memory 534, which can store a status of locations of the mapping memory (e.g., 412). The cache control 532 can facilitate querying the status of a location of the mapping memory corresponding to a k-bit address (e.g., tag) of a memory address of the mapping memory; the querying can be in response to the new logic 502 querying the tracking logic 508 for tracking a new command request. The cache control 532 can facilitate releasing a location of the mapping memory (e.g., 412) in response to an indication from the flush logic 506 to do so. The cache control 532 can also deny the dispatcher 525 (via the mapping generator 530 and the new logic 502) a request (e.g., tracking request) to add tracking of command sub-responses for a command request. The cache control 532 can deny the request by indicating that no locations of the mapping memory (e.g., 412) are available (e.g., all possible locations of the mapping memory have been assigned/mapped/in-use and so the mapping memory is "full").

For some embodiments, the cache control 532 receives a k-bit address (e.g., tag) from the mapping generator 530 in response to the mapping generator 530 receiving an identifier of a command request from the new logic 502. Additionally, based on the k-bit address (e.g., tag), the cache control 532 can query the cache memory 534 for the availability of the location in the mapping memory (e.g., 412) associated with the k-bit address.

Figure 6:
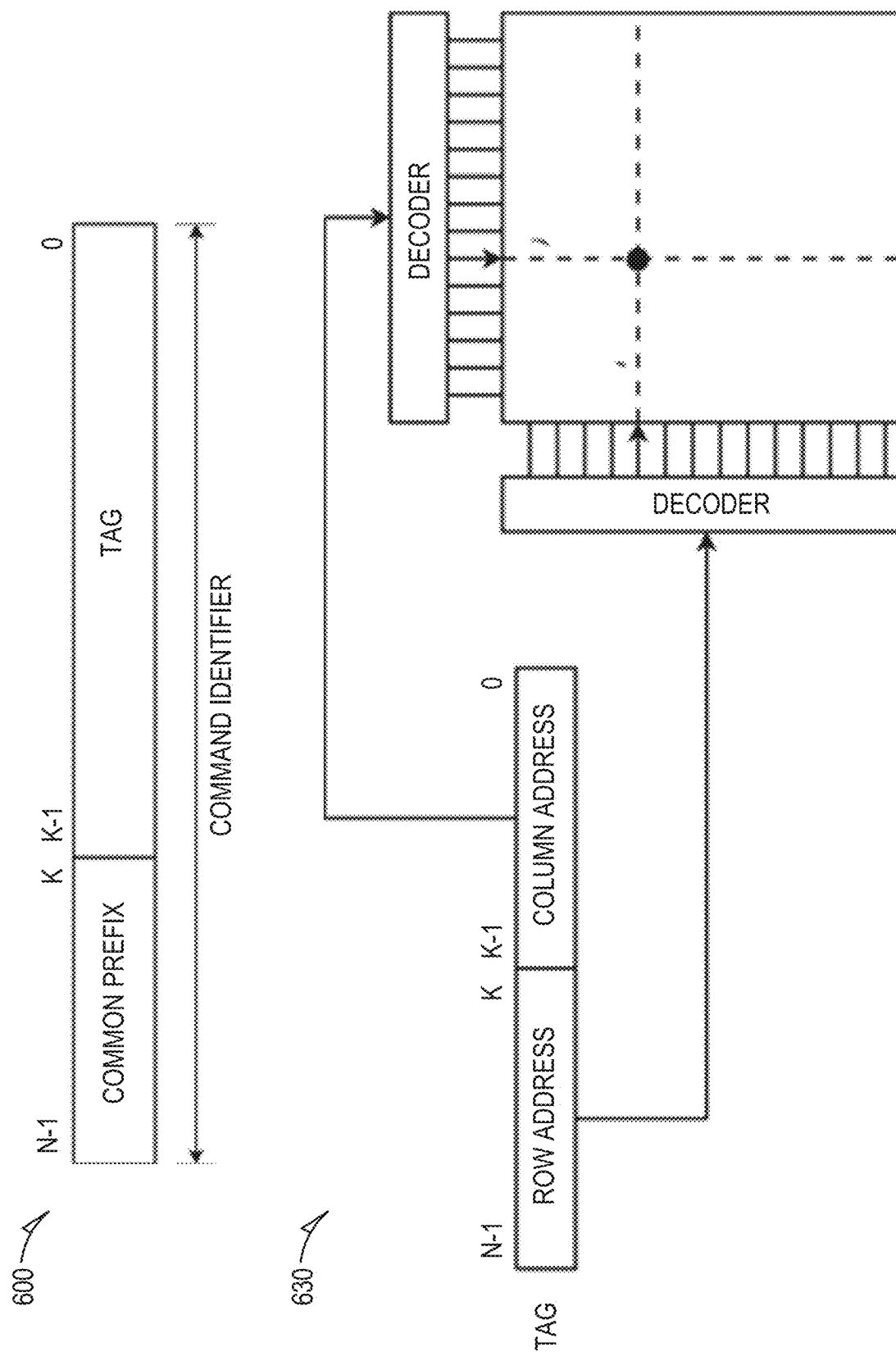
FIG. 6 is a diagram illustrating an example cache memory of a tracking logic of a response reduction component, in accordance with some embodiments of the present disclosure.

FIG. 6 is a diagram illustrating an example cache memory of a tracking logic of a response reduction component (e.g., reducer 426), in accordance with some embodiments of the present disclosure. FIG. 6 also illustrates an example identifier 500 for a command request, where the identifier 600 is an N-bit identifier. As shown, a tag for the identifier 600 comprises the k least significant bits of the identifier 600, thereby providing a k-bit address as the tag. The common prefix of the identifier 600 comprises the remaining, N–k most significant bits of the identifier 600. As described herein, the tag from the identifier 600 can be used to query cache memory (e.g., 534) of a tracking logic (e.g., 508) of a reducer (e.g., 426) to determine availability of a location in mapping memory (e.g., 412) of the reducer.

Diagram 630 illustrates how the cache memory (e.g., 534) of the tracking logic (e.g., 508) can be organized as a matrix of bits, with each bit corresponding to a single location (e.g., physical location) of the mapping memory (e.g., 412) and indicating a status (e.g., availability or unavailability) of the single location. Diagram 630 also illustrates how the tag from the identifier 600 can map (e.g., decode) to a bit at position i, j in the matrix of the cache memory. As shown, the tag can be decoded into $2^R$ rows and $2^C$ columns where the k bits of the tag equals R+C. The bit at position i, j in the matrix of the cache memory can be set to a value of 1 if a command request is currently mapped to the tag, and to a value of 0 otherwise. During a query of the cache memory, a cache hit can represent that the tag is currently mapped to a command request.

Where an identifier (e.g., N-bit identifier) of a command request maps to a tag (e.g., k-bit tag), and it is determined that a tag is already in use (e.g., a cache hit occurs) based on a query of the cache memory, a tracking logic (e.g., 508) of a reducer can determine that a location of a mapping memory corresponding to the tag is already in use (e.g., not available) and can cause a new logic (e.g., 502) of the reducer to wait for the location of the mapping memory to become available. Access reordering mechanism can be implemented to mitigate situations where the new logic has to wait for the location to become available. If the cache memory indicates that all possible locations of the mapping memory are unavailable (e.g., all result in cache hits based on a value of 1), the dispatcher (e.g., 525) operation can be paused until at least one location is made available (e.g., released by the flush logic 506). For some embodiments, performance pressure on this portion of the memory architecture can be reduced by reducing the time to release locations of the mapping memory. The reduction in time can be implemented by a RMW block (e.g., RMW block 410 of FIG. 4) so that a tracking logic grants a update logic with higher priority.

Where the depth of the mapping memory is $2^k$, there are $2^N/2^k$ command requests that map to a single location of the mapping memory (e.g., the location corresponding to a memory address of the mapping memory). Accordingly, there can be $2^N/2^k$ number of rows reserved for each identifier of a command request. The following equation can represent probability of conflict for a location of a mapping memory by two or more command requests.

$$P_C = 1 - \frac{1}{2}^{N-k}$$

Accordingly, by increasing k there are less chances for two command requests to share the same row of the cache memory, as the command-to-depth ratio decreases. With increasing values of k the common prefix N−k can decrease linearly, and the probability of conflict can decrease logarithmically. Accordingly, some embodiments can benefit from increasing the depth of the mapping memory while widening the common prefix of the identifier 600). Additionally, $P_C$ can decrease while k is increased such that:

$$\lim_{k \to N} P_C = 0$$

As such, the conflict of probability can be minimized when the depth of the mapping memory matches the width of the input identifier. The depth of the mapping memory can determine the cost of the solution in terms of area requirements of an embodiment (given that any additional bit can double the area).

Figure 7:
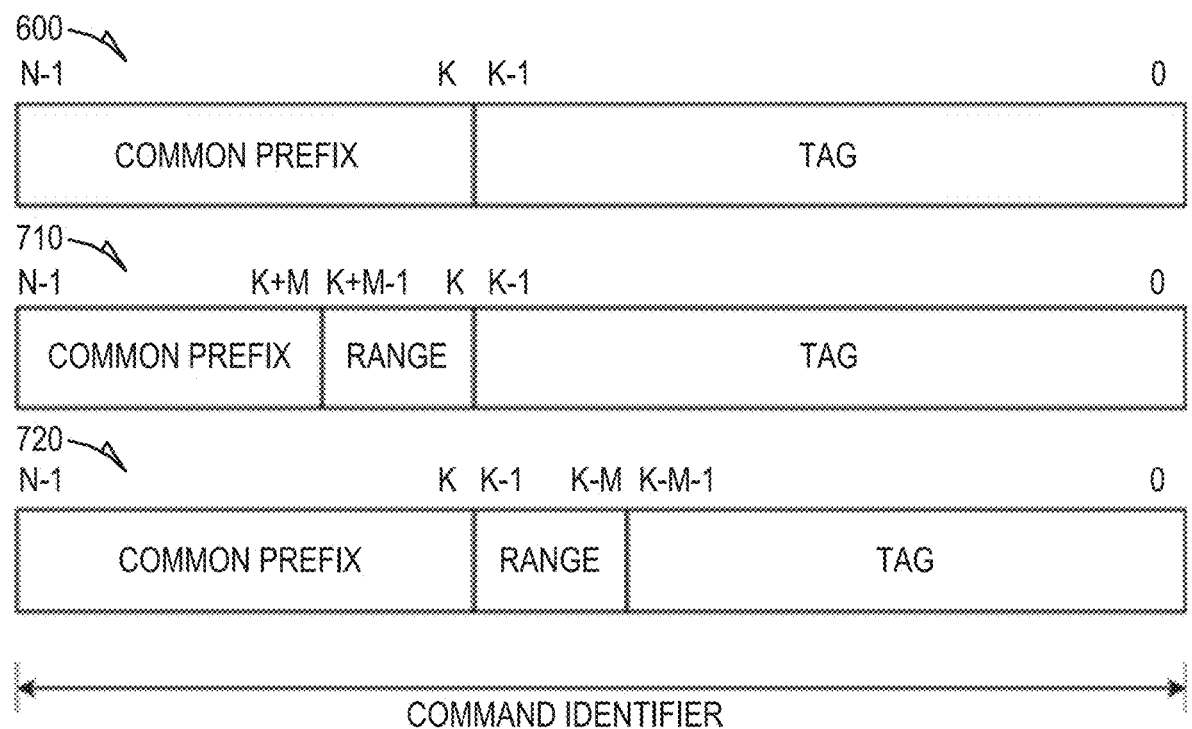
FIG. 7 illustrates example identifiers for command requests that can be used with a cache memory of a tracking logic of a response reduction component, in accordance with some embodiments of the present disclosure.

FIG. 7 illustrates example identifiers for command requests that can be used with a cache memory of a tracking logic of a reducer, in accordance with some embodiments of the present disclosure. As described herein, a tracking logic of a reducer can use a command request-to-location mapping function $\varphi$ (from a N-bit identifier of a command request to a k-bit address) where k is less than N. In such instances, a tracking logic can use a command request-to-location mapping function based on a clustered cache (e.g., as an alternative to a command request-to-location mapping function $\varphi$ based on shared cache). Use of a clustered cache-based mapping function can be beneficial for various embodiment where a subset of data paths (e.g., 127) can potentially preoccupy use of the mapping memory, which can result in unfair allocation of available space of the mapping memory to the subset of data paths. According to some embodiments, the command request-to-location mapping function $\varphi$ based on clustered cache comprises clustering a range of locations (e.g., physical locations) of the mapping memory into sub-ranges, and statically assigning each of the sub-ranges to one or more specific data paths of a memory architecture described herein.

FIG. 7 illustrates example identifiers 710, 720 (for command requests) that can be used with a command request-to-location mapping function $\varphi$ based on a clustered cache. For comparison purposes, FIG. 7 also illustrates the example identifier 500 (for a command request) of FIG. 5, which can be used with a command request-to-location mapping function $\varphi$ based on a shared cache. Each of the identifiers 710, 720 is an example of a N-bit identifier. For each of the identifiers 710, 720, a m-bit portion of the N-bit identifier is reserved to group identifiers into clusters, where the in-bit portion is used to cluster 2^W identifiers into 2^m groups. Identifiers 710, 720 illustrate two options based on the relationship between the values of k, m, and N. The identifier 710 illustrates a performance-centric layout for an identifier, while (in comparison) the identifier 720 illustrates a cost-centric layout for an identifier.

For the identifier 710, the value of k is decided a priori, so that the given $k=\overline{k}$ and the common prefix of the identifier 710 is reduced to $\overline{k}$−m. In such a case, a conflict probability can be represented as $P_C=1-\frac{1}{2}^{(N-m)-k}$, but a cost increases by a factor $2^m$ to keep every range of fixed depth $2^{\overline{k}}$. This can be used for performance-sensitive applications of the memory architecture.

For the identifier 720, the value of k is modified with m. In such a case, a conflict probability can be represented as $P_C=1-\frac{1}{2}^{N-k}$, but without increasing cost. This can be used for cost-sensitive applications of the memory architecture.

Though not illustrated, for some embodiments where a command request-to-location mapping function $\varphi$ (from a N-bit identifier of a command request to a k-bit address) where k is less than N, a command request-to-location mapping function $\varphi$ is based on a FIFO mechanism (e.g., FIFO pool). The command request-to-location mapping function $\varphi$ can comprise a FIFO pool (e.g., FIFO buffer) of available locations of the mapping memory. For some embodiments, the FIFO pool is reset with all indexes in the range $[0, 2^k) \subset \mathbb{N}$. Upon receiving a new command request from a dispatcher (e.g., 425), a new logic (e.g., 402) can pop a first available location (of a mapping memory) from the FIFO pool. When a flush logic (e.g., 406) eventually generates a single command response for a given command request, the flush logic can push the location (of the mapping memory) assigned to the given command request back to the FIFO pool, thereby making it available for future use by a new command request received by the new logic. Since reading from the FIFO pool can be "destructive," every time an available location is taken from the FIFO pool, the location taken will automatically become unavailable (e.g., in-use). Additionally, at each clock cycle the FIFO pool (e.g., FIFO buffer) can comprise only those locations of the mapping memory currently available for tracking command sub-responses for a command request. Where a command request-to-location mapping function $\varphi$ based on a FIFO mechanism is used, the mapping memory can have a depth of $2^k$, where $2^k/2^N$ is the average number of rows that are mapped to each identifier.

Figure 8:
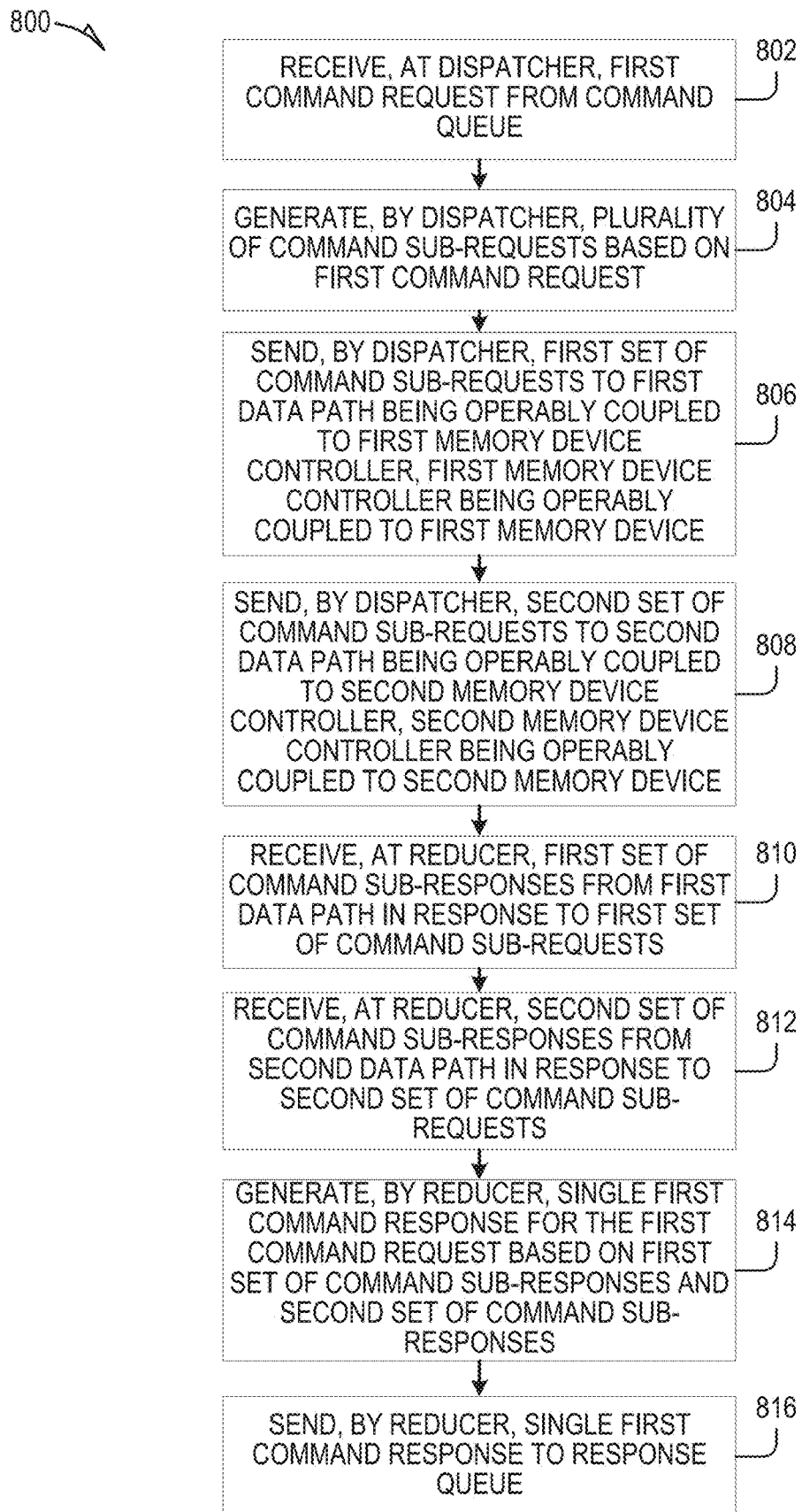
FIGS. 8 and 9 are flow diagrams of example methods relating to memory system architectures for heterogeneous memory technologies, in accordance with some embodiments of the present disclosure.
Figure 9:
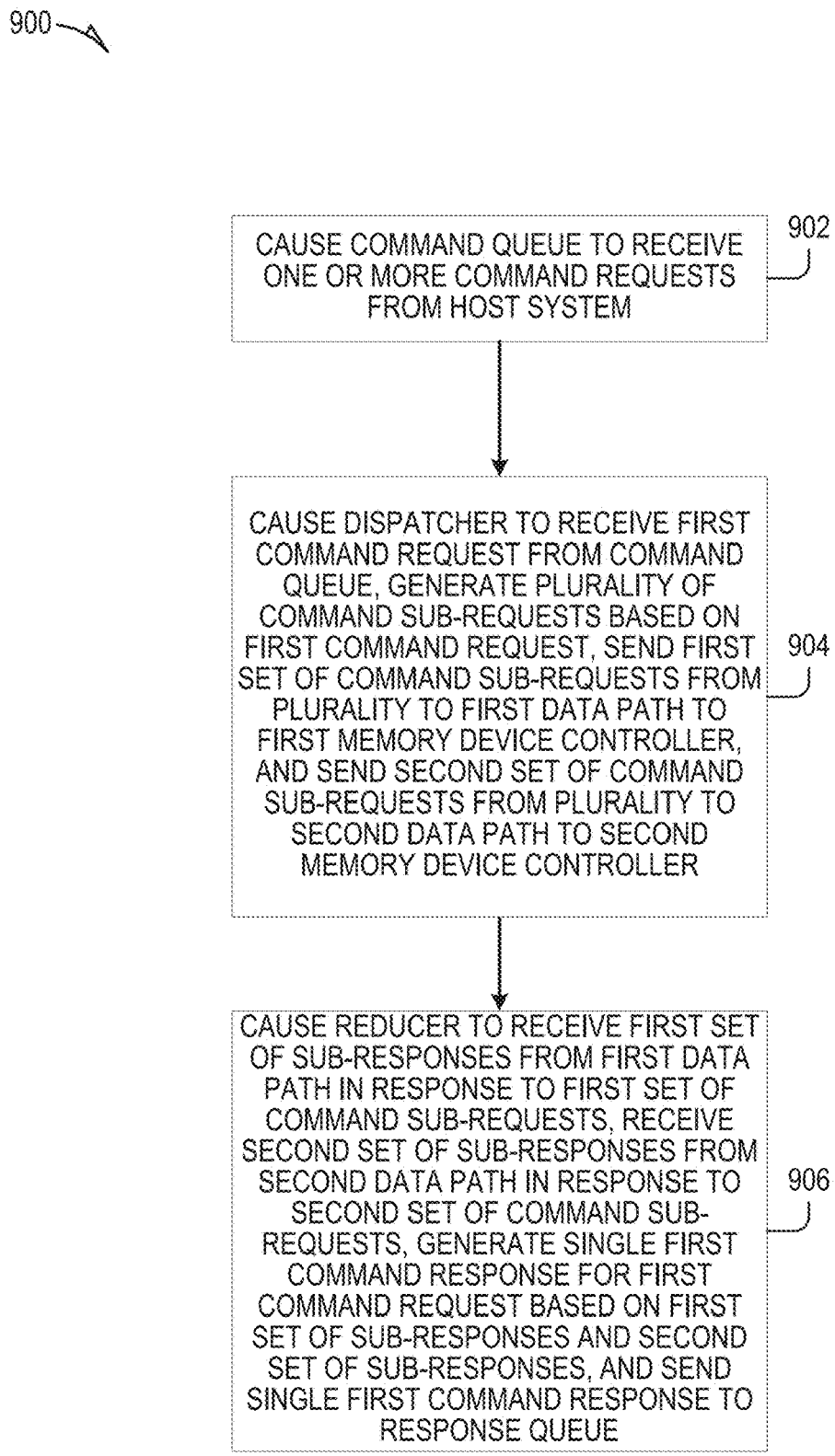

FIGS. 8 and 9 are flow diagrams of example methods relating to memory system architectures for heterogeneous memory technologies, in accordance with some embodiments of the present disclosure. The methods 800, 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, at least one of the methods 800, 900 is performed by the memory sub-system controller 115 of FIG. 1 (based on the CQ 122, the data buffer 123, the RQ 124, the dispatcher 125, the reducer 126, the data paths 127, and the memory device controllers 128). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Referring now to the method 800 of FIG. 8, the method 800 illustrates example operation of a memory system implementing a memory architecture, in accordance with some embodiments of the present disclosure. At operation 802, a dispatcher (e.g., 125) of the memory system receives a first command request (e.g., a read request or a write request) from a command queue (e.g., the 122) of the memory system, where the first command request originated from a host system (e.g., 120). Based on the first command request, the dispatcher (e.g., 126) generates a plurality of command sub-requests at operation 804. For some embodiments, the plurality of command sub-requests comprises at least a first set of command sub-requests (e.g., a single command sub-request) for a first memory device (e.g., 130) of the memory system and a second set of command sub-requests (e.g., a single sub-request) for a second memory device (e.g., 140) of the memory system, where the first memory device and the second memory device are different memory devices.

Operation 804 can comprise the dispatcher (e.g., 125) negotiating with the reducer (e.g., 126) to add sub-response tracking for the first command request in response to the dispatcher (e.g., 125) receiving the first command request from the command queue (e.g., 122). As described herein, the dispatcher (e.g., 125) can negotiate with the reducer (e.g., 126) to add sub-response tracking for the first command request by: sending to the reducer (e.g., 126) a tracking request to add sub-response tracking for the first command request; and receiving a tracking response from the reducer (e.g., 126) in response to the tracking request. Thereafter, the dispatcher (e.g., 125) can generate the plurality of command sub-requests (for the first command request) based on the first command request and the tracking response from the reducer (e.g., 126). The tracking request can comprise, for example, a command identifier (e.g., command queue identifier) associated with the first command request, and a command memory address (e.g., target or source memory address) associated with the first command request. Additionally, the tracking request can comprise a query asking the reducer (e.g., 126) whether the reducer 126 is capable of adding (e.g., has sufficient memory resources available to add) sub-response tracking for the first command request.

The dispatcher (e.g., 125), at operation 806, sends (e.g., forwards or routes) the first set of command sub-requests to a first data path (e.g., of the data paths 127) of the memory system and, at operation 808, sends the second set of command sub-requests to a second data path of the memory system. The memory system can comprise more than the first and second data paths. According to various embodiments, the first data path is operably coupled to a first memory device controller (e.g., of the memory device controllers 128) of the memory system, and the first memory device controller is operably coupled to the first memory device (e.g., 130). Additionally, for various embodiments, the second data path is operably coupled to a second memory device controller (e.g., of the memory device controllers 128) of the memory system, and the second memory device controller being operably coupled to the second memory device (e.g., 140). The first and second memory device controllers can be separate and of different type. Alternatively, both the first and the second data paths are operably coupled to a single memory device controller, but each is used to interact with different memory devices operably coupled to the single memory device controller.

At operation 810, a reducer (e.g., 126) of the memory system receives a first set of command sub-responses from the first data path in response to the first set of command sub-requests sent by the dispatcher (e.g., 125) to the first data path. According to some embodiments, the first set of command sub-responses is generated by the first memory device controller based on the first set of command sub-requests received from the dispatcher (e.g., 125). Similarly, at operation 812, the reducer (e.g., 126) receives a second set of command sub-responses from the second data path in response to the second set of command sub-requests sent by the dispatcher (e.g., 125) to the second data path. For some embodiments, the second set of command sub-responses is generated by the second memory device controller based on the second set of command sub-requests received from the dispatcher (e.g., 125).

With respect to operation 814, the reducer (e.g., 126) generates a single first command response for the first command request based on the first set of command sub-responses (received at operation 810) and the second set of command sub-responses (received at operation 812). The reducer 126 sends the single first command response to a response queue (e.g., 124) of the memory system at operation 816.

Referring now to the method 900 of FIG. 9, the method 900 illustrates an example of operations performed by a processing device of a memory system, in accordance with some embodiments. At operation 902, a processing device (e.g., the processor 117 of the memory sub-system controller 115) of a memory system causes a command queue (e.g., the CQ 122 of the memory sub-system controller 115) of the memory system to receive one or more command requests from a host system (e.g., 120).

At operation 904, the processing device 117) causes a dispatcher (e.g., the dispatcher 125 of the memory sub-system controller 115) of the memory system to receive a first command request from the command queue (e.g., 122). The processing device (e.g., 117) causes, at operation 904, the dispatcher (e.g., 125) to generate a plurality of command sub-requests based on the first command request. Additionally, at operation 904, the processing device (e.g., 117) causes the dispatcher (e.g., 125) to: send a first set of command sub-requests from the plurality of command sub-requests to a first data path (e.g., of the data paths 127) of the memory system to a first memory device controller (e.g., of the memory device controllers 128) of the memory system; and send a second set of command sub-requests from the plurality of command sub-requests to a second data path (e.g., of the data paths 127) of the memory system to a second memory device controller (e.g., of the memory device controllers 128) of the memory system. For various embodiments, the first memory device controller is operably coupled to a first memory device (e.g., 130) of the memory system, and the second memory device controller is operably coupled second memory device (e.g., 140) of the memory system. The first memory device can be a different type of memory device than the second memory device.

With respect to operation 906, the processing device (e.g., 117) causes a reducer (e.g., the reducer 126 of the memory sub-system controller 115) of the memory system to receive a first set of command sub-responses from the first data path in response to the first set of command sub-requests and to receive a second set of command sub-responses from the second data path in response to the second set of command sub-requests. The processing device (e.g., 117) causes, at operation 906, the reducer (e.g., 126) to generate a single first command response for the first command request based on the first set of command sub-responses and the second set of command sub-responses. Additionally, at operation 906, the processing device (e.g., 117) causes the reducer (e.g., 126) to send the single first command response to a response queue (e.g., the RQ 124 of the memory sub-system controller 115) of the memory system. As described herein, the response queue (e.g., 124) can be configured to provide the single first command response to the host system (e.g., 120).

Figure 10:
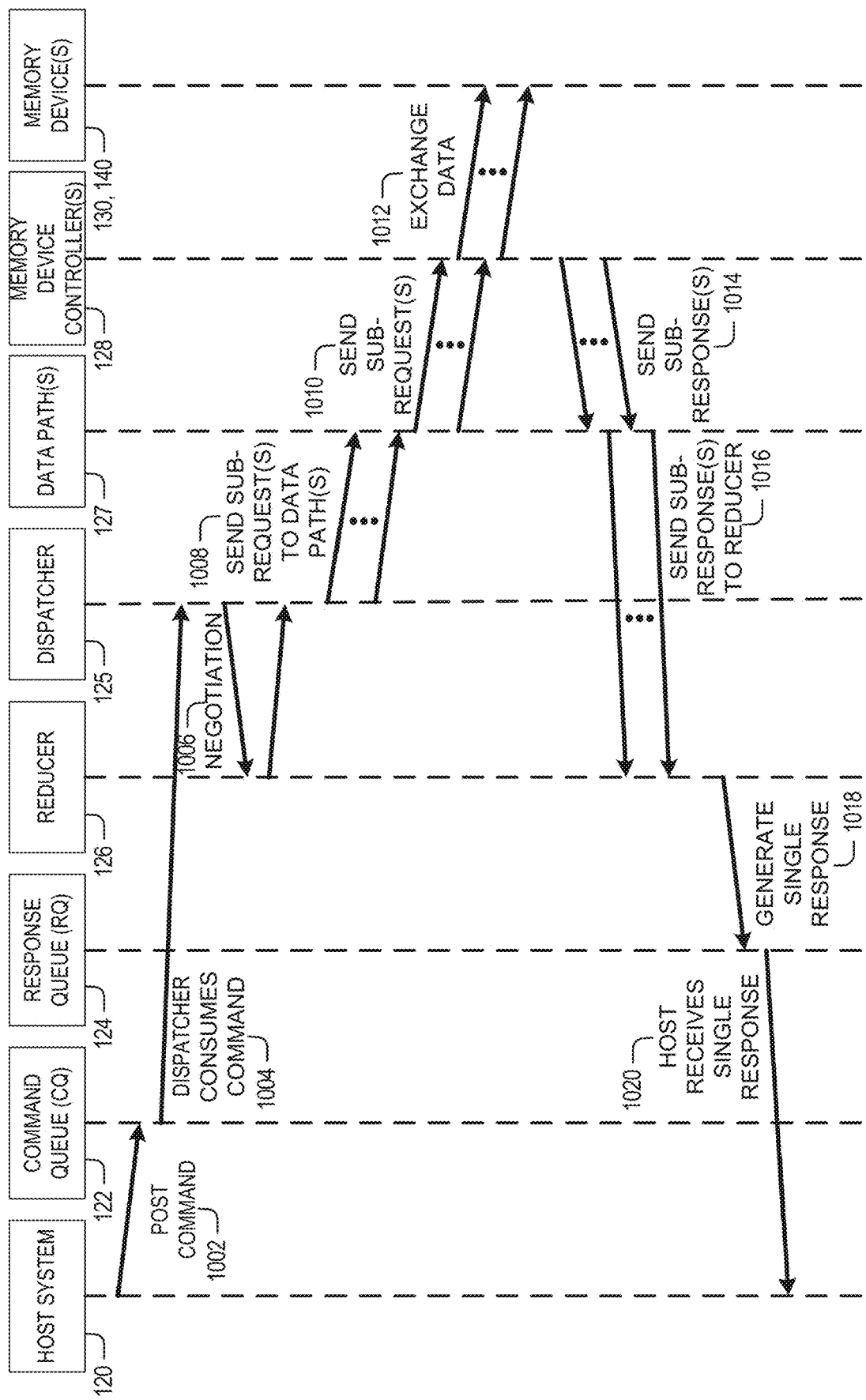
FIG. 10 provides an interaction diagram illustrating interactions between components of a computing environment in the context of some embodiments in which a method for a memory architecture described herein is performed.

FIG. 10 provides an interaction diagram illustrating interactions between components of a computing environment in the context of some embodiments in which a method for a memory architecture described herein is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120), a command queue (e.g., 122), a response queue (e.g., 124), a reducer (e.g., 126), a dispatcher (e.g., 125), data paths (e.g., 127), memory device controllers (e.g., 128), and memory devices (e.g., 130, 140), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. In the context of the example illustrated in FIG. 10, the host system can include the host system 120, the command queue can include the CQ 122, the response queue can include RQ 124, the reducer can include reducer 126, the dispatcher can include the dispatcher 125, the data paths can include the data paths 127, the memory device controllers can include the memory device controllers 128, and the memory devices can include the memory devices 130, 140.

As shown in FIG. 10, at operation 1002, the host system 120 posts a command request to the CQ 122. The dispatcher 125, at operation 1004, consumes (e.g., receives) the command request from the CQ 122. In response to the command request, at operation 1006 the dispatcher 125 negotiates with the reducer 126 to add sub-response tracking for the command request. Additionally, upon successfully adding sub-response tracking for the command request, the dispatcher 125 generates one or more command sub-requests based on the command request and sends the one or more command sub-requests to the data paths 127 at operation 1008.

Thereafter, at operation 1010, the data paths 127 send (e.g., convey) the one or more command sub-requests to one or more of the memory device controllers 128. In response to the command sub-requests, at operation 1012 the one or more memory device controllers 128 exchange data with one or more of the memory devices 130, 140. Based on the exchange of data between the one or more memory device controllers 128 and the one or more memory devices 130, 140, the one or more memory device controllers 128 sends one or more command sub-responses to the data paths 127 at operation 1014. At operation 1016, the data paths 127 send the one or more command sub-responses to the reducer 126.

In response to receiving the one or more command sub-responses, the reducer 126 generates a single command response based on the one or more command sub-responses and sends the single command response to the RQ 124 at operation 1018. Eventually, at operation 1020, the host system 120 receives the single response from the RQ 124 as a response to the command request posted at operation 1002.

Figure 11:
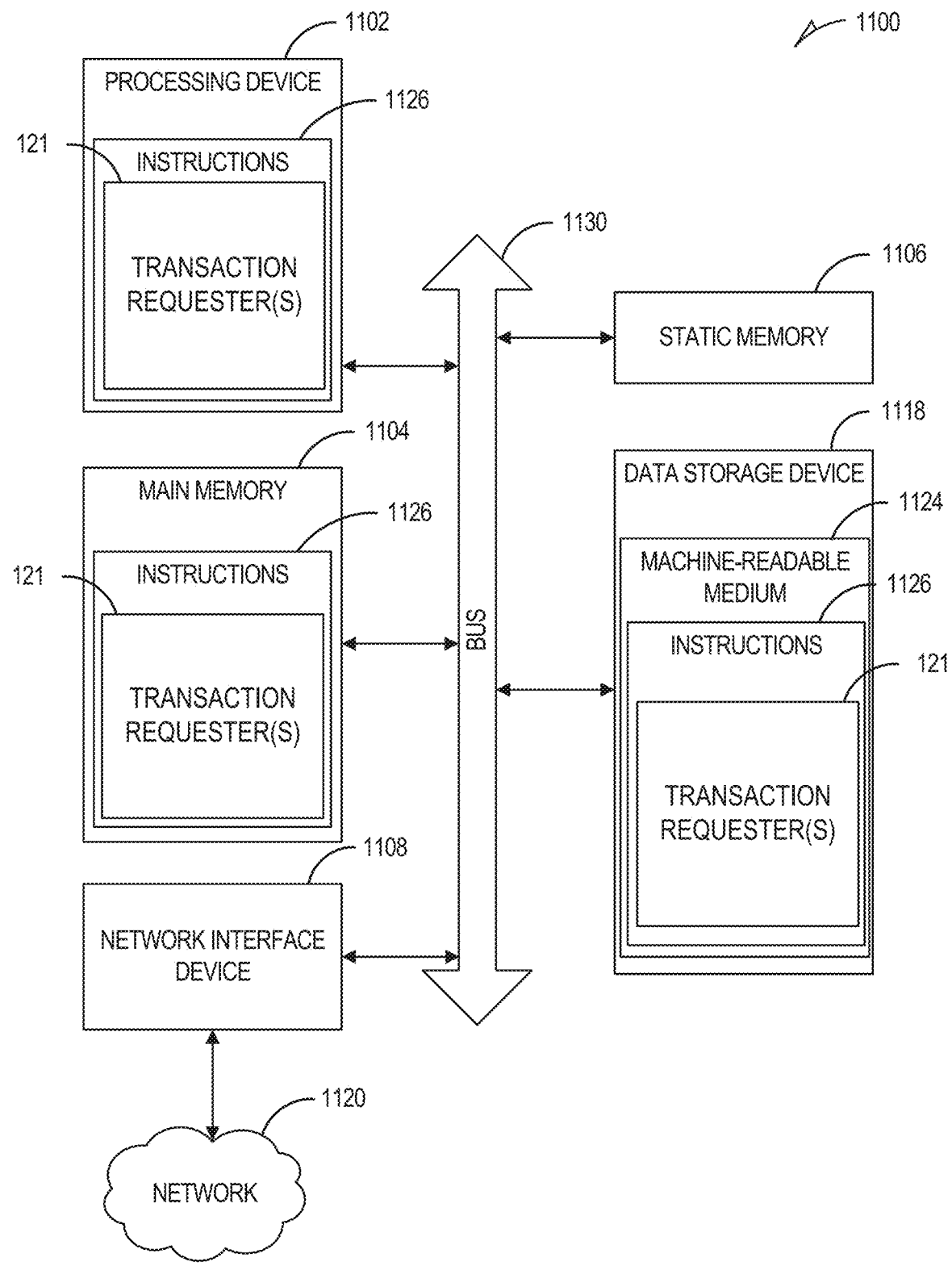
FIG. 11 is a block diagram of an example computer system in which embodiments of the present disclosure may operate.

FIG. 11 illustrates an example machine in the form of a computer system 1100 within which a set of instructions can be executed for causing the machine to perform any one or more of the methodologies discussed herein. In some embodiments, the computer system 1100 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a data storage device 1118, which communicate with each other via a bus 1130.

The processing device 1102 represents one or more general-purpose processing devices such as a microprocessor, a central processing unit, or the like. More particularly, the processing device 1102 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 1102 can also be one or more special-purpose processing devices such as an application-specific integrated circuit (ASIC), a field programmable gate array (FPGA), a digital signal processor (DSP), a network processor, or the like. The processing device 1102 is configured to execute instructions 1126 for performing the operations and steps discussed herein. The computer system 1100 can further include a network interface device 1108 to communicate over a network 1120.

The data storage device 1118 can include a machine-readable storage medium 1124 (also known as a computer-readable medium) on which is stored one or more sets of instructions 1126 or software embodying any one or more of the methodologies or functions described herein. The instructions 1126 can also reside, completely or at least partially, within the main memory 1104 and/or within the processing device 1102 during execution thereof by the computer system 1100, the main memory 1104 and the processing device 1102 also constituting machine-readable storage media. The machine-readable storage medium 1124, data storage device 1118, and/or main memory 1104 can correspond to the memory sub-system 110 of FIG. 1.

In one embodiment, the instructions 1126 include instructions to implement (e.g., based on the transaction requesters 121 of FIG. 1) functionality for generating command requests on a host system and sending the command requests to a memory sub-system based on a memory architecture as described herein. While the machine-readable storage medium 1124 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine- (e.g., a computer-) readable storage medium such as a read-only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a plurality of memory devices comprising a first memory device of a first type and a second memory device of a second type, the first type being different from the second type;
   a set of memory device controllers operably coupled to the first memory device and the second memory device;
   a plurality of data paths operably coupled to the set of memory device controllers, the plurality of data paths comprising a first data path to interact with the first memory device and a second data path to interact with the second memory device;
   a command queue configured to receive one or more command requests from a host system;
   a dispatcher configured to receive a first command request from the command queue, to generate a first plurality of command sub-requests based on the first command request, to send a first command sub-request from the first plurality of command sub-requests to the first data path, to send a second command sub-request from the first plurality of command sub-requests to the second data path, and to negotiate with a response reduction component to add sub-response tracking for the first command request in response to the dispatcher receiving the first command request from the command queue;
   the response reduction component configured to receive a first command sub-response from the first data path in response to the first command sub-request, to receive a second command sub-response from the second data path in response to the second command sub-request, and to generate a single first command response for the first command request based on the first command sub-response and the second command sub-response; and
   a response queue configured to receive the single first command response from the response reduction component and to provide the single first command response to the host system.

2. The system of claim 1, wherein the dispatcher negotiates with the response reduction component to add sub-response tracking for the first command request by:
   sending to the response reduction component a first tracking request to add sub-response tracking for the first command request; and
   receiving a first tracking response from the response reduction component in response to the first tracking request, the first plurality of command sub-requests being generated by the dispatcher based on the first command request and the first tracking response.

3. The system of claim 2, wherein the first tracking response comprises a first tracking identifier used by the response reduction component to track command sub-responses for the first command request, and wherein each command sub-request of the first plurality of command sub-requests comprises the first tracking identifier.

4. The system of claim 2, wherein the first tracking response indicates whether the response reduction component successfully added sub-response tracking for the first command request.

5. The system of claim 2, wherein the first tracking request comprises a first command identifier from the first command request and a first command memory address from the first command request, wherein the response reduction component comprises a mapping memory, and wherein the response reduction component is configured to:
store the first command identifier and the first command memory address in a first mapping entry for sub-response tracking for the first command request, the first mapping entry being stored on the mapping memory of the response reduction component.

6. The system of claim 5, wherein the response reduction component is configured to:
generate the first tracking response in response to the first tracking request received from the dispatcher, the first tracking response comprising a first tracking identifier used by the response reduction component to track command sub-responses for the first command request, the first tracking identifier being based on an address of the mapping memory where the first mapping entry for the first command request is stored.

7. The system of claim 2, wherein the dispatcher negotiates with the response reduction component to add sub-response tracking for the first command request by:
determining a count of command sub-requests in the first plurality of command sub-requests; and
informing the response reduction component regarding the count of command sub-requests, the response reduction component comprising a mapping memory, and the response reduction component being configured to:
store the count of command sub-requests in a first mapping entry for the first command request, the first mapping entry being stored on the mapping memory of the response reduction component.

8. The system of claim 2, wherein the response reduction component comprises a mapping memory to store a first mapping entry for the first command request, wherein the first mapping entry is initially generated based on the dispatcher negotiating with the response reduction component to add sub-response tracking for the first command request, and wherein the first mapping entry comprises:
a count of command sub-requests in the first plurality of command sub-requests;
a current status for the first command request, the current status being updated based on at least one command sub-response received by the response reduction component, from one or more data paths of the plurality of data paths, for the first command request; and
a command sub-response counter for the first command request, the command sub-response counter tracking how many command sub-responses have been received by the response reduction component, from one or more data paths of the plurality of data paths, for the first command request.

9. The system of claim 2, wherein the response reduction component comprises a mapping memory to store a first mapping entry for the first command request, wherein the first mapping entry is initially generated based on the dispatcher negotiating with the response reduction component to add sub-response tracking for the first command request, and wherein the first mapping entry comprises:
a first command identifier from the first command request;
a first command memory address from the first command request; and
command sub-response information collected from command sub-responses received for the first command request, the command sub-response information being included in the single first command response generated by the response reduction component for the first command request.

10. The system of claim 2, wherein the first tracking response comprises a unique identifier used by the response reduction component to track command sub-responses for the first command request, wherein the unique identifier is different from a first command identifier from the first command request, and wherein the dispatcher is configured to include the unique identifier in each command sub-request in the first plurality of command sub-requests generated by the dispatcher.

11. The system of claim 1, wherein the first command request comprises a first command identifier, wherein the single first command response comprises the first command identifier, and wherein the first command identifier is unique from command identifiers for other command requests in the command queue.

12. The system of claim 1, wherein the response reduction component comprises a mapping memory, the response reduction component being configured to:
after receiving the first command sub-response:
reading a first command sub-response tracking identifier from the first command sub-response;
identifying, based on the first command sub-response tracking identifier, a mapping entry in the mapping memory associated with the first command request; and
updating the mapping entry based on the first command sub-response.

13. The system of claim 1, wherein the response reduction component comprises a mapping memory, and wherein the response reduction component generates the single first command response for the first command request based on the first command sub-response and the second command sub-response by:
determining whether a mapping entry for the first command request indicates that a condition for generating the single first command response has been satisfied, the mapping entry being stored on the mapping memory; and
generating the single first command response for the host system based on the first command sub-response and the second command sub-response.

14. The system of claim 13, wherein the mapping entry comprises:
a count of command sub-requests in the first plurality of command sub-requests; and
a command sub-response counter for the first command request, the command sub-response counter tracking how many command sub-responses have been received by the response reduction component for the first command request, the condition comprising that the command sub-response counter for the first command request equals the count of command sub-requests.

15. The system of claim 1, wherein the response reduction component comprises a mapping memory storing a mapping entry for the first command request, and wherein the response reduction component generates the single first command response for the first command request based on the first command sub-response and the second command sub-response by:

generating the single first command response based on command sub-response information collected in the mapping entry, the command sub-response information being collected from command sub-responses received by the response reduction component for the first command request, and the command sub-response information comprising information provided by the first command sub-response and information provided by the second command sub-response.

16. A method comprising:

receiving, at a dispatcher of a memory system, a first command request from a command queue of the memory system, the first command request originating from a host system;

generating, by the dispatcher, a plurality of command sub-requests based on the first command request, the plurality of command sub-requests comprising a first set of command sub-requests for a first memory device of the memory system and a second set of command sub-requests for a second memory device of the memory system, and the first memory device being a different type of memory device than the second memory device;

sending, by the dispatcher, the first set of command sub-requests to a first data path of the memory system, the first data path being operably coupled to a first memory device controller of the memory system, and the first memory device controller being operably coupled to the first memory device;

sending, by the dispatcher, the second set of command sub-requests to a second data path of the memory system, the second data path being operably coupled to a second memory device controller of the memory system, and the second memory device controller being operably coupled to the second memory device;

receiving, at a response reduction component of the memory system, a first set of command sub-responses from the first data path in response to the first set of command sub-requests, the first set of command sub-responses being generated by the first memory device controller based on the first set of command sub-requests;

receiving, at the response reduction component, a second set of command sub-responses from the second data path in response to the second set of command sub-requests, the second set of command sub-responses being generated by the second memory device controller based on the second set of command sub-requests; and generating, by the response reduction component, a single first command response for the first command request based on the first set of command sub-responses and the second set of command sub-responses, the generating the plurality of command sub-requests comprising negotiating, by the dispatcher, with the response reduction component to add sub-response tracking for the first command request in response to the dispatcher receiving the first command request from the command queue.

17. The method of claim 16, further comprising:
sending, by the response reduction component, the single first command response to a response queue of the memory system, the response queue being configured to provide the single first command response to the host system.

18. The method of claim 16, wherein the response reduction component comprises a mapping memory, the method comprising:

after receiving the first set of command sub-responses:
reading, by the response reduction component, a first command sub-response tracking identifier from a first command sub-response in the first set of command sub-responses;
identifying, based on the first command sub-response tracking identifier, a mapping entry in the mapping memory associated with the first command request; and
updating, by the response reduction component, the mapping entry based on the first command sub-response.

19. The method of claim 16, wherein the response reduction component comprises a mapping memory, and wherein the generating the single first command response for the first command request based on the first set of command sub-responses and the second set of command sub-responses comprises:

determining whether a mapping entry for the first command request indicates that a condition for generating the single first command response has been satisfied, the mapping entry being stored on the mapping memory; and
generating the single first command response for the host system based on the first set of command sub-responses and the second set of command sub-responses.

20. At least one non-transitory machine-readable storage medium comprising instructions that, when executed by a processing device of a memory system, cause the processing device to perform operations comprising:

causing a command queue of the memory system to receive one or more command requests from a host system;

causing a dispatcher of the memory system to receive a first command request from the command queue, to generate a plurality of command sub-requests based on the first command request, to send a first set of command sub-requests from the plurality of command sub-requests to a first data path of the memory system operably coupled to a first memory device controller of the memory system, to send a second set of command sub-requests from the plurality of command sub-requests to a second data path of the memory system operably coupled to a second memory device controller of the memory system, and to negotiate with a response reduction component of the memory system to add sub-response tracking for the first command request in response to the dispatcher receiving the first command request from the command queue, the first memory device controller being operably coupled to a first memory device of the memory system, the second memory device controller being operably coupled to a second memory device of the memory system, and the first memory device being a different type of memory device than the second memory device; and causing the response reduction component to receive a first set of command sub-responses from the first data path in response to the first set of command sub-requests, to receive a second set of command sub-responses from the second data path in response to the second set of command sub-requests, to generate a single first command response for the first command request based on the first set of command sub-responses and the second set of command sub-responses, and to send the single first command response to a response queue of the memory system, the response queue being configured to provide the single first command response to the host system.

\* \* \* \* \*